(12) United States Patent
Fahrion

(10) Patent No.: US 6,782,665 B2
(45) Date of Patent: Aug. 31, 2004

(54) DOCK UNIT FOR MAINTENANCE OF AN AIRCRAFT OR THE LIKE

(76) Inventor: Otmar Fahrion, Remsstr. 11, Kornwestheim (DE), D-70806

( * ) Notice: Subject to any disclaimer, the term of this patent is extended or adjusted under 35 U.S.C. 154(b) by 0 days.

(21) Appl. No.: 10/342,140

(22) Filed: Jan. 14, 2003

(65) Prior Publication Data

US 2004/0006930 A1 Jan. 15, 2004

(30) Foreign Application Priority Data

Jan. 14, 2002 (DE) .......................... 102 01 202

(51) Int. Cl.[7] .............. E04B 7/16; E04B 1/34; E04G 21/04; E04G 3/14; E01D 1/00
(52) U.S. Cl. .............. 52/64; 52/73; 52/127.2; 182/36; 14/69.5
(58) Field of Search .......................... 52/64, 73, 127.2, 52/646; 14/69.5; 182/36, 150, 115

(56) References Cited

U.S. PATENT DOCUMENTS

| | | | | |
|---|---|---|---|---|
| 3,814,211 A | * | 6/1974 | Pamer | 182/14 |
| 3,831,709 A | * | 8/1974 | Stanford et al. | 180/125 |
| 4,759,437 A | * | 7/1988 | Bevins | 198/632 |
| 5,363,940 A | * | 11/1994 | Fahrion | 182/62.5 |
| 5,375,283 A | * | 12/1994 | Silberman | 14/69.5 |
| 5,381,575 A | * | 1/1995 | Silberman | 14/69.5 |
| 5,423,396 A | * | 6/1995 | Fahrion | 182/36 |
| 5,638,420 A | * | 6/1997 | Armistead | 378/57 |
| 5,701,704 A | * | 12/1997 | Landes | 52/64 |
| 6,311,434 B1 | * | 11/2001 | Nelson | 52/143 |
| 6,378,387 B1 | * | 4/2002 | Froom | 73/865.8 |
| 2002/0066710 A1 | * | 6/2002 | Spitsbergen | 212/179 |
| 2003/0180132 A1 | * | 9/2003 | Morreim | 414/458 |

FOREIGN PATENT DOCUMENTS

| | | |
|---|---|---|
| DE | 40 17 513 | 5/1990 |
| DE | 44 20 502 | 6/1994 |
| DE | 197 41 692 | 9/1997 |
| EP | 568 543 | 12/1991 |
| GB | 1 032 434 | 6/1966 |
| WO | WO 95/07232 | 3/1995 |

* cited by examiner

*Primary Examiner*—Carl D. Friedman
*Assistant Examiner*—Kevin McDermott
(74) *Attorney, Agent, or Firm*—King & Jovanovic, PLC

(57) ABSTRACT

In a dock unit for maintenance of aircraft there is provided, in addition to an outer support which supportingly engages against a frame disposed parallel to the longitudinal axis of the aircraft in the vicinity of the end of said frame and is adjustable, a further support which is located further in and is likewise adjustable. The distance between the two supports is greater than the largest dimension of the wings of the aircraft to be maintained, measured in the longitudinal direction of the fuselage. One of the supports can therefore be temporarily retracted in order to move a wing past and below this support.

22 Claims, 33 Drawing Sheets

DOCK UNIT FOR MAINTENANCE OF AN AIRCRAFT OR THE LIKE

BACKGROUND OF THE INVENTION

1. Field of the Invention

The invention relates to the field of maintenance docks for aircraft and similar large elongated vehicles.

2. Background Art

To be able to carry out maintenance and painting work on aircraft, maintenance docks are used which include working floors carried by a frame, from which floor workers have access to the exterior of the aircraft. To carry out work, these maintenance docks are typically erected in such a way as to be adjacent to the outer skin of the aircraft. The docks have in each case openings through which the wings of the aircraft pass. To be able to dock and undock the aircraft without dismantling the dock it has already been proposed to arrange the frame of the dock so as to be displaceable in a lateral direction on the floor of the maintenance hangar (EP 0 568 543 A1).

This manner of enabling docking and undocking presupposes, however, that the hangar is large enough to allow a correspondingly large lateral displacement of the dock. The hangar must, therefore, be wider than the wingspan of the largest aircraft to be serviced by at least twice the transverse dimension of the dock units erected on each side of the fuselage. For practical embodiments of dock units, this dimension is approx. 10 m. For the time needed for docking and undocking—which is short in comparison to the time for the work at the dock (a few days for minor maintenance and a few months for the D check)—the maintenance hangar must, therefore, be built significantly larger than is necessary for its actual purpose.

A larger maintenance hangar means not only higher construction costs but also higher continuous operating costs. For example, in hangars in which aircraft are painted an unnecessarily large volume of air must be maintained at drying temperature over relatively long periods. In addition, to ensure the laminar airflow used for drying freshly painted aircraft greater expenditure is needed in larger hangars.

The heating costs and the costs for maintaining clean air and air disposal are also increased.

In addition, in the case of some existing hangars it would be desirable to be able to service aircraft with still larger wingspans without reconstruction of the hangar.

It is, therefore, the object of the invention to specify a maintenance dock for aircraft in which docking and undocking is possible without transverse displacement of the dock units beyond the wingtips.

SUMMARY OF THE INVENTION

This object is achieved according to the invention by a maintenance dock having a frame (22) which carries at least one working floor and is supported in an unchangeable manner at one end (18) and an outer end of which rests on a floor (36) via an outer support (42), characterized in that the frame (22) is supported on the floor (36) via at least one further, inner support (44) and the outer support (42) and the further, inner supports (44) are movable between a prop position in which they engage supportingly against the frame (22) and a clearance position in which they open a passage (38) between the frame (22) and the floor (36).

Common to the various embodiments of the invention is the idea of removing for a short time a support supporting the frame of a dock unit on the erection surface and thereby producing in the area of this support a temporary passage for the wing of an aircraft. In this time, the frame is supported on the erection surface by a different measure, which according to one embodiment is a further, inner support and according to another embodiment is a suspension arrangement.

Because the time for docking and undocking is short and because, in order to dock and undock the aircraft, any especially heavy equipment and local material stores located in the dock unit can be removed, the further, inner support or suspension arrangement need not be designed especially strong or engage at precisely the same point on the frame as the outer support which normally supports a front section of the frame.

According to the invention, therefore, a passage for the aircraft wing is created for a short time for docking and undocking. The dock unit thus in a sense climbs over the wing of the moving aircraft. Where a dock unit rests on the erection surface via a multiplicity of supports the appropriate supports, in so far as they are located in the path of the wings of the aircraft to be maintained, can all be made movable, a passage which moves along with the aircraft wing being created between the underside of the dock frame and the erection surface by pulling up a support or a group of supports in each case. It is self-evident that, in the case of a multiplicity of such supports, the change in the loading of the dock frame caused by moving one of the supports from the prop position supporting the frame to a clearance position creating said passage is proportionally smaller.

The solution according to the invention can be used equally for docking an aircraft in the forward direction (nose in) and in the reverse direction (tail in).

Because the maintenance dock according to the invention can remain standing during docking and undocking, all the line connections between the dock unit and the hangar can also remain unchanged (electric leads, fluid lines, ventilation shafts and so on). This simplifies and shortens the process of docking and undocking.

Because no dead spaces which serve only to accommodate the dock unit during docking and undocking have to be provided in the maintenance hangar when using the dock unit according to the invention, considerable savings can be made in the construction, maintenance and operating costs of the maintenance hangar. Aircraft whose wingspans are only slightly shorter than the clear width of the hangar itself can be maintained in existing maintenance hangars.

In the claims and in the present description, directional indications relating to the maintenance hangar and to the direction of movement of the aircraft during docking and undocking are used. Maintenance hangars have large doors through which the aircraft are towed into and out of the hangar. Where these doors are located is "outside". An opposite wall of the maintenance hangar in which storage rooms, workshops and offices are usually arranged is located "inside". The direction perpendicular (from "outside" to "inside") to the wall containing the door is the direction in which a dock unit placed beside the aircraft extends. This direction corresponds to the longitudinal axis of the aircraft. "Above" and "below" correspond to normal linguistic usage.

For each of the dock units, "inward" means the side facing towards the aircraft while "outward" means the side facing away from the aircraft.

Transverse means perpendicular to the longitudinal direction of the dock or to the longitudinal axis of the aircraft.

Advantageous refinements of the invention are specified in the subsidiary claims.

Having supports which are adjustable in the vertical direction is especially advantageous with regard to space utilization. The displaceable supports occupy the same space in both working positions when seen from above.

In one embodiment of the invention, the vertically adjustable support is attached to the frame. Such a refinement of the invention has the advantage that no constructional alterations to the hangar are necessary. A dock unit according of such an embodiment can be installed without difficulty in existing maintenance hangars.

In one embodiment, at least one of the supports is retractable into the floor. Such a refinement of the invention has the advantage that the dock frame does not need to carry the adjustable supports and the drives acting on them.

In one such embodiment, the free end face of the supports which are retractable into the floor are flush with the floor in the fully retracted state. In such a case, a continuous flat floor area of the maintenance hangar can be ensured by complete retraction of the vertically movable supports into the erection surface.

In another embodiment of the invention, at least one of the supports is movable across the floor. Such a refinement of the invention has the advantage that neither constructional measures relating to the building nor special measures relating to the dock frame need to be provided. The latter need neither support the weight of the displaceable supports in their clearance position nor carry drives for moving the displaceable supports.

In one such embodiment of the invention, the at least one support which is movable across the floor can be coupled to a vehicle or carriage which runs on the floor. Such a refinement is advantageous in that displacement of the movable supports can be effected simply and quickly.

In one such embodiment, at least one of the supports which are movable across the floor is of lower height than the passage between the underside of the frame and the floor and has an adjustable strut, the stroke of which is short in comparison to the height of the passage. The total height of the support and the adjustable strut in the fully extended state of the latter is greater than the height of the passage. With such a refinement, it is achieved that the supports can be moved into and out of the force transmitting gap between the dock frame and the erection surface without the use of external auxiliary means. When placed out of frictional engagement they can be easily moved.

In another aspect of the invention, at least one of the supports which are movable on the floor is provided with a stairway. With this refinement of the invention, it is achieved that the displaceable supports at the same time create additional access ways to the working floors of the dock unit, providing shorter paths from the floor of the maintenance hangar to the outer skin of a docked aircraft.

In one aspect of the invention, at least one of the supports which are movable across the floor takes the form of a lattice strut structure. This refinement of the invention is advantageous with regard to a good load-bearing capacity of a movable support combined with low weight, and with regard to accommodating a relatively large stairway which is easy to climb.

In another aspect of the invention, at least one of the displaceable supports is pivoted. This refinement of the invention is advantageous because the guidance for the movement of the displaceable support between the prop position and the clearance position can be realized at low cost.

In one embodiment, the pivot axis of at least one of the pivoted supports is disposed horizontally and transversely with respect to the longitudinal direction of the frame. This variant has the advantage that the pivoted support is located within the same transverse or lateral spatial area both in the prop position and in the clearance position.

In another aspect of the invention, at least one of the supports includes a hydraulic cylinder or a threaded spindle. Such a refinement of the invention according permits simple adjustment of the length of the adjustable supports, whether in order directly to create a passage for the aircraft wing or in order to remove the support from frictional engagement between the dock frame and the erection surface in order to ensure easy movability.

In yet another embodiment, the dock unit includes at least one further, inner support which is displaceable between a prop position supporting the frame and a clearance position unblocking the space between the frame and the floor. Such a dock unit makes use both of the possibility of further inner displaceable supports and of the possibility of suspending the dock frame. In this way, the forces which must be absorbed by other elements can be spread when the outer support or other supports are moved to the clearance position.

In one embodiment of the invention, the suspension arrangement includes a crane. If a crane is used in the suspension arrangement, the force exerted on the frame of the dock unit can be easily adjusted and the suspension arrangement can be realized by a means which as a rule is already provided in any case for other tasks in the maintenance hangar.

In one such embodiment, the crane is carried by a crane trolley which runs on a crane rail fixed to a roof structure. For example, a ceiling crane which for the remaining time is provided for moving heavy loads in the maintenance hangar can be temporarily used for docking and undocking.

Alternatively, an embodiment may include a crane which is carried by a vehicle. In particular, a drivable crane which likewise is present in most maintenance hangars can be used.

In another embodiment, presence sensors may be arranged in front of and/or behind the displaceable supports to respond to the presence of an object in the space located between the frame and the floor. In particular, it is automatically monitored whether an obstacle (in particular a section of an aircraft) is located in the environment of the path through which the displaceable support passes. The output signals can be used in controlling the drives which act on the displaceable supports.

In a preferred embodiment, position indicators which indicate whether the movable supports are in their prop position or in their clearance position. In such an embodiment, the momentary positions of the displaceable supports can be monitored. The output signals of the position indicators co-operating with the supports can be used to activate displays and alarms or can directly influence the motion of the aircraft during docking or undocking.

In another aspect of the invention, a control circuit for a drive and/or for a brake which co-operate in a driving/braking manner with the aircraft, which control circuit activates the drive and/or releases the brake in the presence of an output signal of a presence sensor only if an output signal for the clearance position associated with the clearance position of the displaceable inner support which is next reached is deceived at the same time from the position indicator associated with this support. Such a structure ensures that an aircraft can be moved into or out of the dock unit only to the extent that a passage accommodating the wing of the aircraft has already been created by moving supports from the prop position to the clearance position.

In yet another aspect of the invention, the frame is movable in a transverse horizontal direction with respect to the longitudinal direction of the frame. This measure is advantageous because it allows the movable supports to be provided closer together, since the width of a wing generally decreases markedly towards the free end. This measure also simplifies the maneuvering of the aircraft in and out between the dock units.

BRIEF DESCRIPTION OF THE DRAWINGS

Embodiments of the invention are explained in more detail below with reference to the drawings. Where subsequent drawings serve to explain movements, some details which have been shown in the preceding general drawing are omitted for clarity and must be imagined. In the drawings.

DETAILED DESCRIPTION OF THE DRAWINGS

Figure 1:
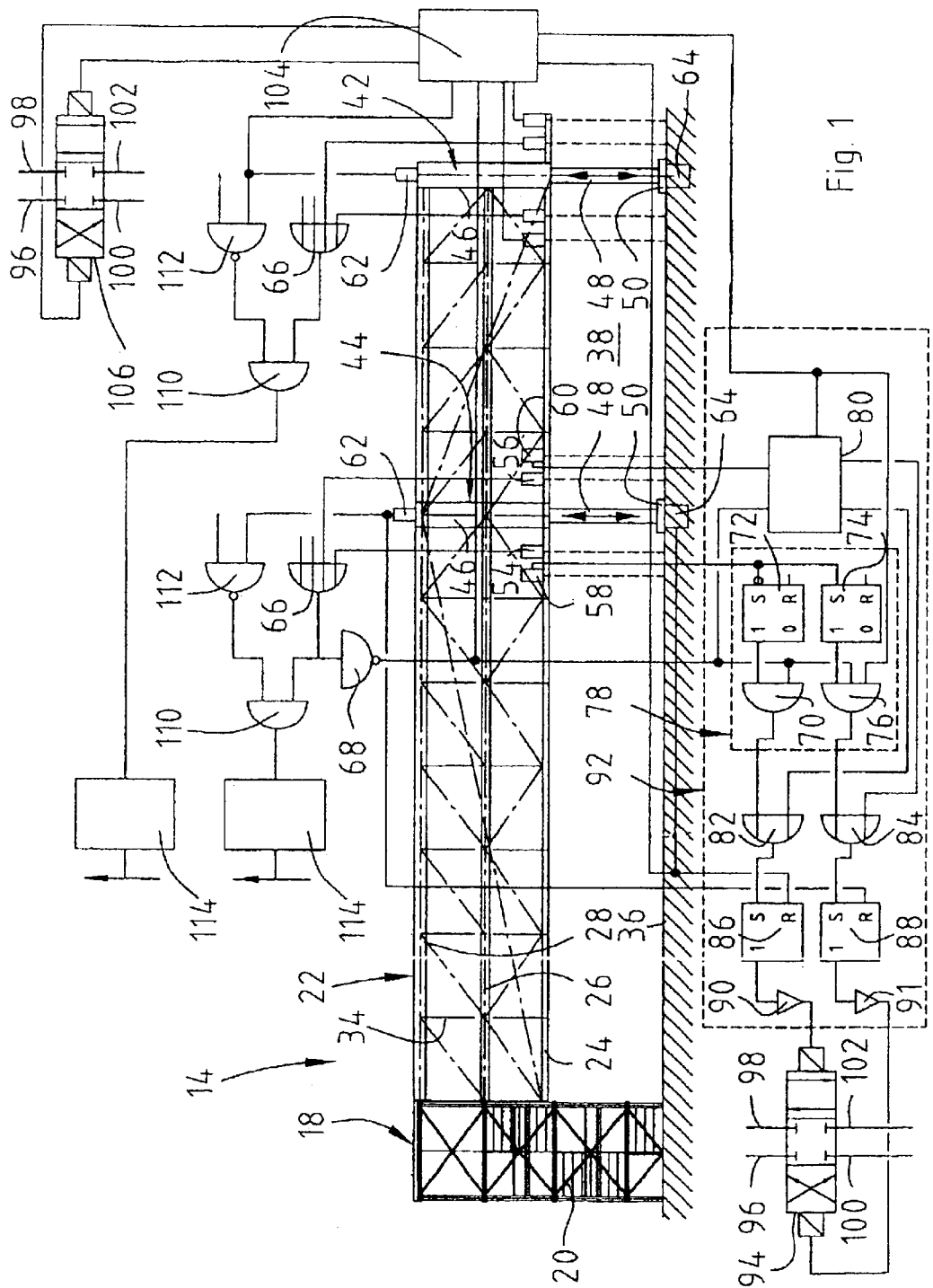
FIG. 1 shows a side view of a dock unit and of an electrical and hydraulic circuit for adjusting supports via which a frame of the dock unit stands on the floor of a maintenance hangar.

While this invention is susceptible of embodiment in many different forms, there is shown in the drawings and described herein in detail a specific embodiment with the understanding that the present disclosure is to be considered as an exemplification of the principles of the invention and is not intended to limit the invention to the embodiment illustrated.

Figure 6:
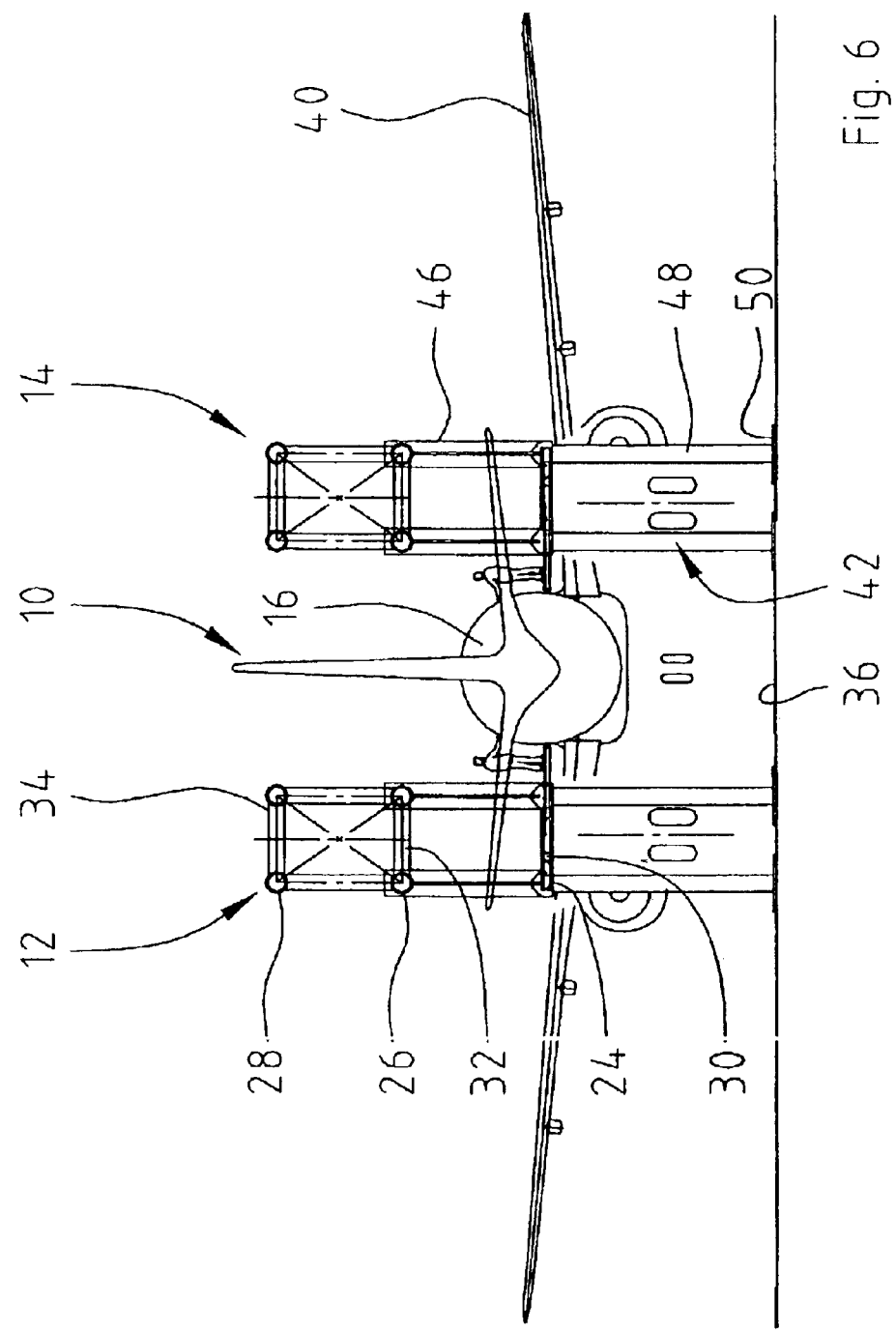
FIG. 6 shows a view from outside (from the door of the hangar) of a dock comprising two dock units.

As can be seen from FIGS. 1 and 6, a dock unit for an aircraft 10 consists of two dock units 12, 14 which are erected parallel to the axis of the aircraft fuselage on each side of the fuselage.

The two dock units 12, 14 are constructed in a mirror-symmetrical manner so that it is sufficient to describe one of the dock units in more detail, namely dock unit 14.

The dock unit 14 has a rear tower-like dock section 18 configured as a lattice strut structure and accommodating a stairway 20. The tower-like dock section 18 supports the inner end of a horizontal dock section 22 which is also configured as a lattice strut structure. The dock section 22 has an inward strut arrangement facing towards the aircraft 10 and a similarly constructed outward strut arrangement (see also FIG. 6).

The strut arrangements comprise three horizontal main beams 24, 26, 28, represented by continuous lines, which are rigidly connected together by transverse horizontal main beams 30, 32, 34 which link together the main beams 24, 26 and 28. Further lattice struts which reinforce the fields of the lattice are indicated by dot-dash lines in FIG. 1.

As can be seen from FIGS. 1 and 6, a passage 38 which can accommodate a wing 40 of the aircraft 10 and in principle makes possible movement of the aircraft 10 in the longitudinal direction of the dock section 22 remains between the lower main beams 24 and the floor, denoted by reference numeral 36, of the maintenance hangar.

Because the horizontal dock section 22 is of great length it is not supported in a cantilevered manner by dock section 18 but rests via supports on the hangar floor.

Extensible supports 42 are provided near the outer end of the dock section 22 while extensible supports 44 are provided further in. The supports 42, 44 comprise in each case a hydraulic cylinder 46 of long stroke, to the bottom of the piston rod 48 of which is attached a footplate 50 co-operating with the hangar floor.

It is self-evident that the supports 42, 44 are provided in pairs corresponding to the two sets of main beams which are provided in the face of the dock section 22 adjacent to the aircraft and in the face of the dock section 22 remote from the aircraft. These different elements, which in each case are visible only once in the Figure, will be described only once below. It is self-evident that the descriptions apply equally to the side of the dock section 22 remote from the aircraft.

The distance between the supports 42 and 44 in the longitudinal direction of the dock section 22 is so selected that the largest wing of the aircraft to be maintained in the dock unit fits with clearance between the supports 42 and 44.

Under working conditions, the supports 42 and 44 provide support for the outer part of dock section 22 but block the passage 38.

However, because the supports 42, 44 are retractable, the passage 38 can be opened for a short time in the area of one of the supports 42, 44, the other support, which remains extended, for a short time taking over the load of the retracted support.

Figure 2:
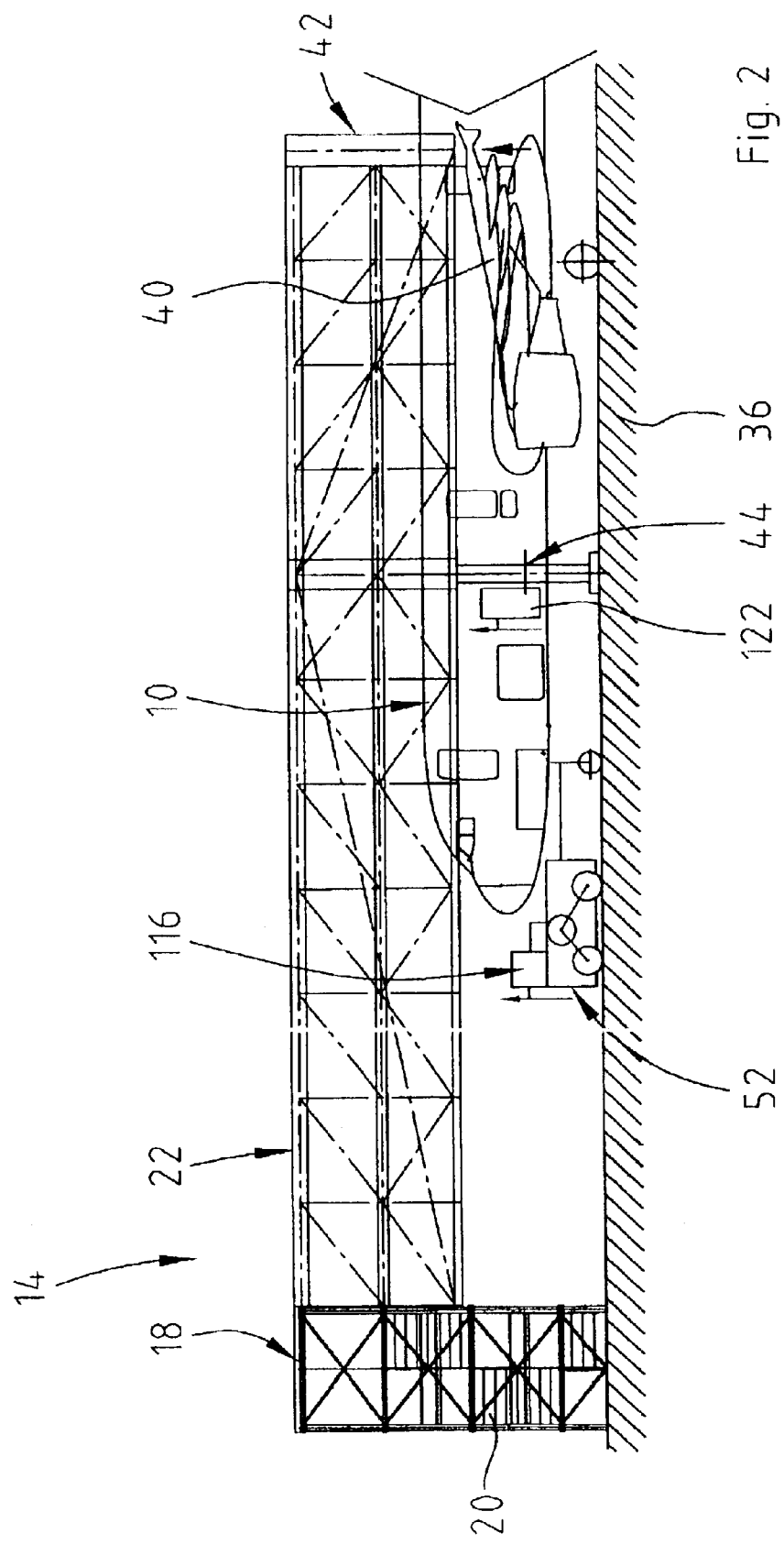
FIGS. 2 to 5 show similar views to FIG. 1, in which different phases of docking an aircraft are reproduced, only the mechanical parts of the dock unit being shown.
Figure 3:
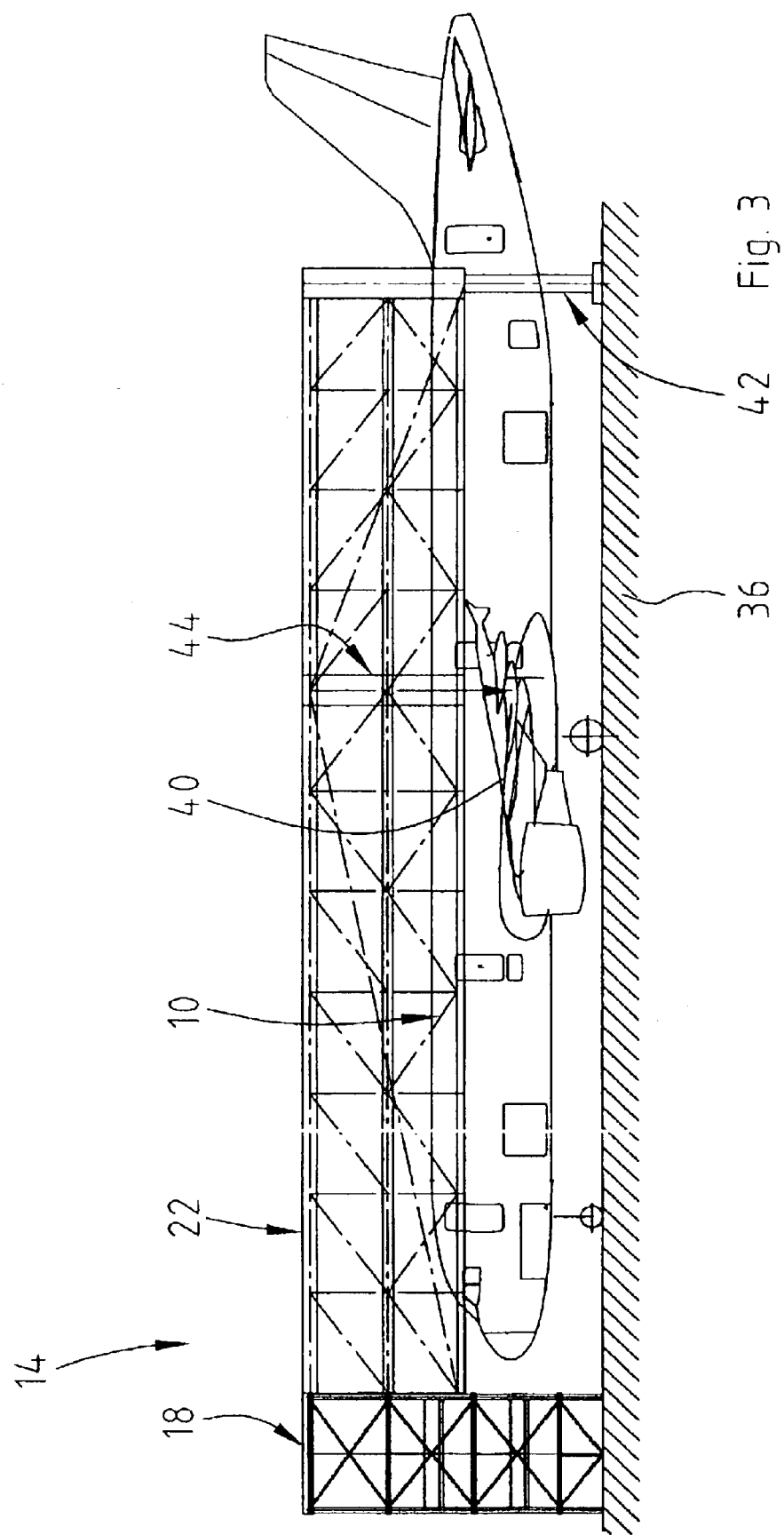
Figure 4:
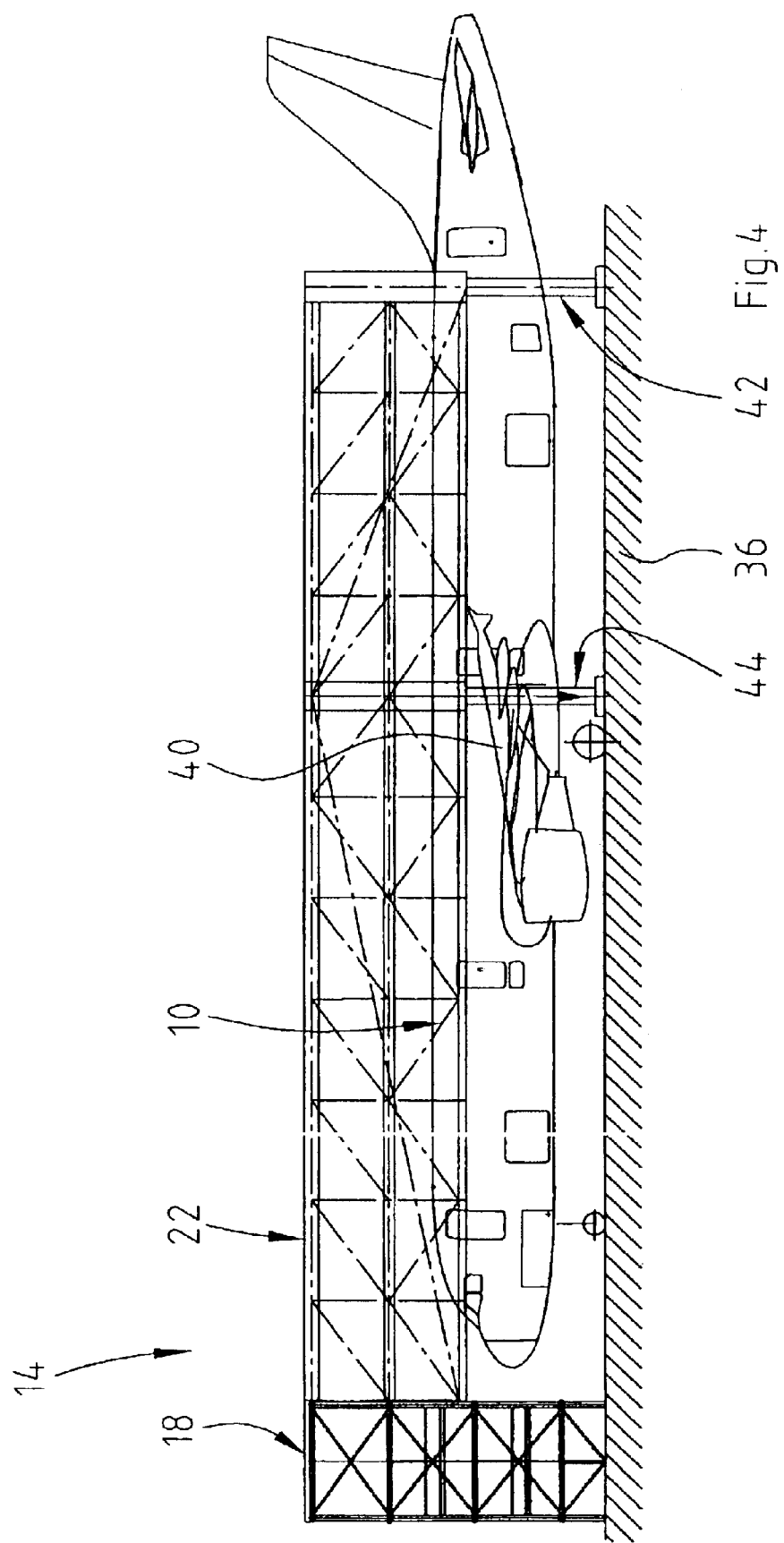

In the case of the above-described dock unit, the docking of an aircraft takes place as follows:

First, the outer supports 44 are retracted so that the passage 38 is opened in the area of the supports 42. Now the aircraft is towed into the dock unit by a tug 52, which is indicated schematically in FIG. 2 only, until its wings 40 are positioned between the two supports 42 and 44. The support 42 is now extended again. Once it has reached its prop position in which it supports the outer end of the dock section 22, the support 44 can be retracted until its footplate 50 is located higher than the wing 40. In this clearance position, the passage 38 is opened in the area of the support 44. The aircraft 10 can now be towed further into the interior of the dock unit, as shown in FIG. 3. Once the aircraft has been towed into the dock unit until the rear edge of the wing 40 is further in than the supports 44, the supports 44 can likewise be extended once more. The dock section 22 is now again supported via the two supports 42 and 44.

If desired, however, the supports 44 can also be left in the raised state if the lattice structure of the dock section is so designed that the support provided at the free outer end by the supports 44 is sufficient. The supports 42 are then used to support the dock section 22 only as long as the supports 42 must be placed in the clearance position.

Figure 5:
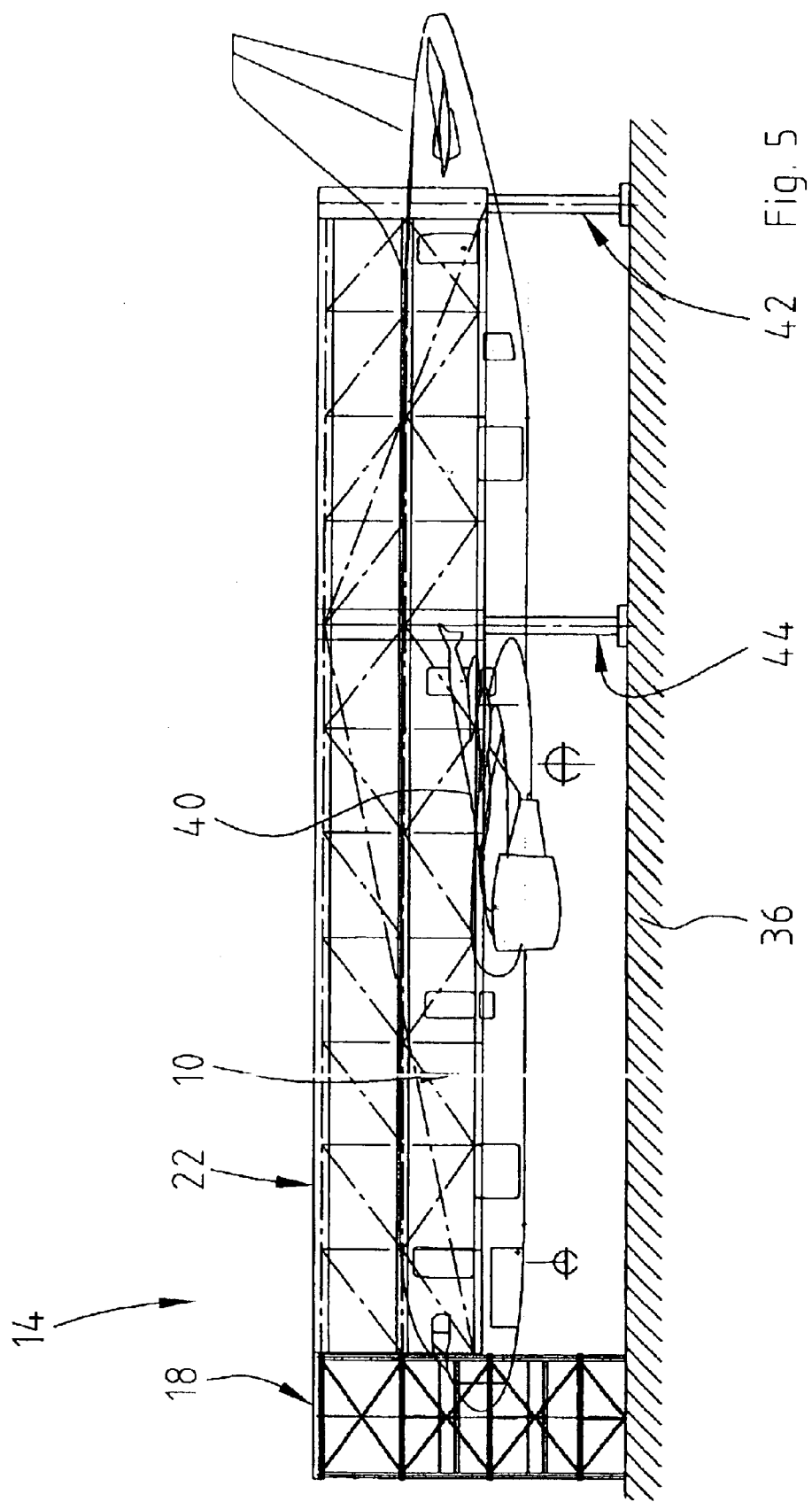

In FIGS. 5 and 6, it is shown that the aircraft 10 is additionally raised from the floor after docking in order to obtain better access to the underside of the fuselage, the undercarriages and the engines. This jacking-up of the aircraft is effected by using extensible supports which are applied to predefined contact points on the fuselage and/or the wings.

The control system of the hydraulic cylinders 46 of the supports 42 and 44 will now be explained in more detail with reference to FIG. 1.

To ensure that the supports 42 and 44 cannot be moved back into their prop position when the wing 40 of the aircraft is still located in the passage 38, presence sensors 54, 56 are provided ahead of and behind the supports 42 and 44, seen in the longitudinal direction of the dock section 22. Said presence sensors 54, 56 can be, for example, contactless sensors operating by reflection, e.g. IR light barriers, radar barriers or ultrasound barriers. Television cameras or other optical imaging arrangements are also possible.

Provided at a greater distance from the supports 42, 44 are further presence sensors 58, 60 which serve to cause retraction of the supports on the approach of a wing edge, provided the other support is in the prop position.

To determine whether one of the supports 42, 44 is in its prop position or its clearance position, a limit switch 62 is provided for each of the supports, which limit switch 62 responds if the piston rod 48 of the hydraulic cylinder 46 is fully retracted. Provided in the floor of the hangar on the axis of the hydraulic cylinders 46 are force sensors 64 which generate an output signal if the associated support is fully extended and again exerts force on the hangar floor.

The different sensors are connected as follows: The output signals of the presence sensors 54, 56 are combined via an OR element 66 (free inputs of this element stand for the presence sensors 54, 56 on the other side of the dock section 22). The output signal of the OR element 66 is transmitted to an invert gate 68. A signal is, therefore, obtained at the output of the latter only if the passage 38 is free both at the presence sensor 54 and at the present sensor 56. The output of the invert gate 68 is connected to an input of an AND element 70.

The other input of the AND element 70 is connected to the "1" output of a bistable sweep circuit 72. The latter's set input "S" triggers, as indicated by a small circle, on descending signal slopes.

A signal is, therefore, always obtained at the output of the AND element 70 if the rear edge of the wing moves past the presence sensor 58 while docking and the passage in the detection areas of the presence sensors 54 and 56 is free.

The output of the presence sensor 58 is further connected to the set input "S" of a further bistable sweep circuit 74, the "1" output of which is connected to the first input of an AND element 76. The latter's second input is connected to the output of the force sensor 64 associated with the support 42.

A signal is, therefore, always obtained at the output of the AND element 76 if, while undocking the aircraft, the rear edge of the wing reaches the presence sensor 58 and the support 42 is in the prop position.

As can be seen, the output signal of the AND element 70 can therefore be used, when docking, to move the support 44 back to the prop position, and the output signal of the AND element 76 can be used, when undocking the aircraft, to move the support 42 automatically to the clearance position.

In this way, the switching circuits 66 to 76 form a support control circuit denoted as a whole by reference numeral 78.

An analogously constructed support control circuit 80 is connected to the presence sensor 60. It is used, when docking the aircraft, to retract the support 44 when the front edge of the wing reaches the presence sensor 60, and, when undocking the aircraft, to move the support 44 back to the prop position when the front edge of the wing moves out beyond the presence sensor 60.

The retraction control signals and the extension control signals supplied by the support control circuits 78 and 80 are combined via OR elements 82, 84.

The output of the OR element 82 is connected to the set input "S" of a bistable sweep circuit 86, the output of the OR element 84 to the set input of a bistable sweep circuit 88.

The "1" outputs of the bistable sweep circuits 86, 88 are connected in each case to one of the actuating magnets of a 4/3 control valve 94 via amplifiers 90, 91 respectively. Said control valve 94 connects two working lines 96, 98, which lead to the two working chambers of the hydraulic cylinders 46 of the supports 44, optionally to a pressure line 100 or a return line 102 of a hydraulic circuit.

A control circuit 104 having the same structure as the control circuit 92 is provided for the support 42. The control signals generated thereby activate a 4/3 control valve 106 through which the working chambers of the hydraulic cylinders 46 of the supports 42 are connectable optionally to the pressure line 100 or the return line 102.

The sensors provided near the supports 42, 44 can also be used to automatically stop the motion of the aircraft if the required passage has not yet been opened in the area of a support.

For this purpose, the output of the OR element 66 is connected to a first input of an AND element 110 which also receives the inverted output signal of the limit switch 62 via a NAND element 112. The second input of the NAND element 112 is connected to the limit switch 62 of the support 44 located behind the plane of projection in FIG. 1.

A signal is, therefore, obtained at the output of the AND element 110 only if the support 44 is retracted and no obstacle is present in the area of the presence sensor 54, 56. This signal is transmitted via a wireless modem element indicated schematically at 114 to a suitable wireless modem element 116 which is provided on the tug 52. The control signal recovered there can be used to control a drive 118 which acts on wheels 120 of the tug 52 and/or to apply the brakes of the tug.

In addition, a further modem element 122 can be provided in the aircraft which also receives the radio signal generated by the modem element 114 and recovers therefrom the motion control signal. This signal can be used to apply or release the brakes of the aircraft.

In this way, errors which might be caused by inattention during docking and undocking are largely avoided.

Figure 7:
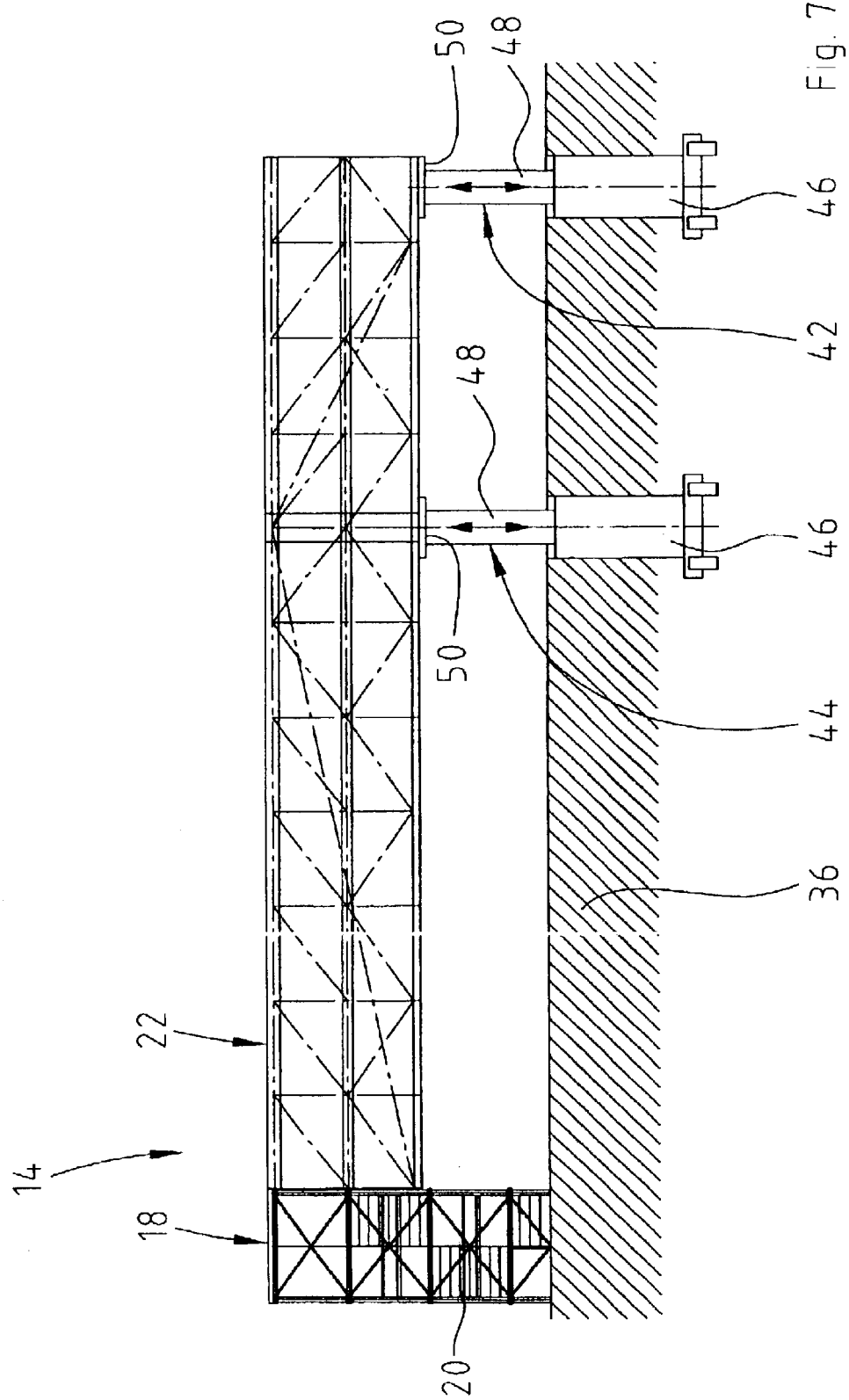
FIG. 7 shows a similar view to FIG. 1, the mechanical parts of a modified maintenance dock being shown.
Figure 8:
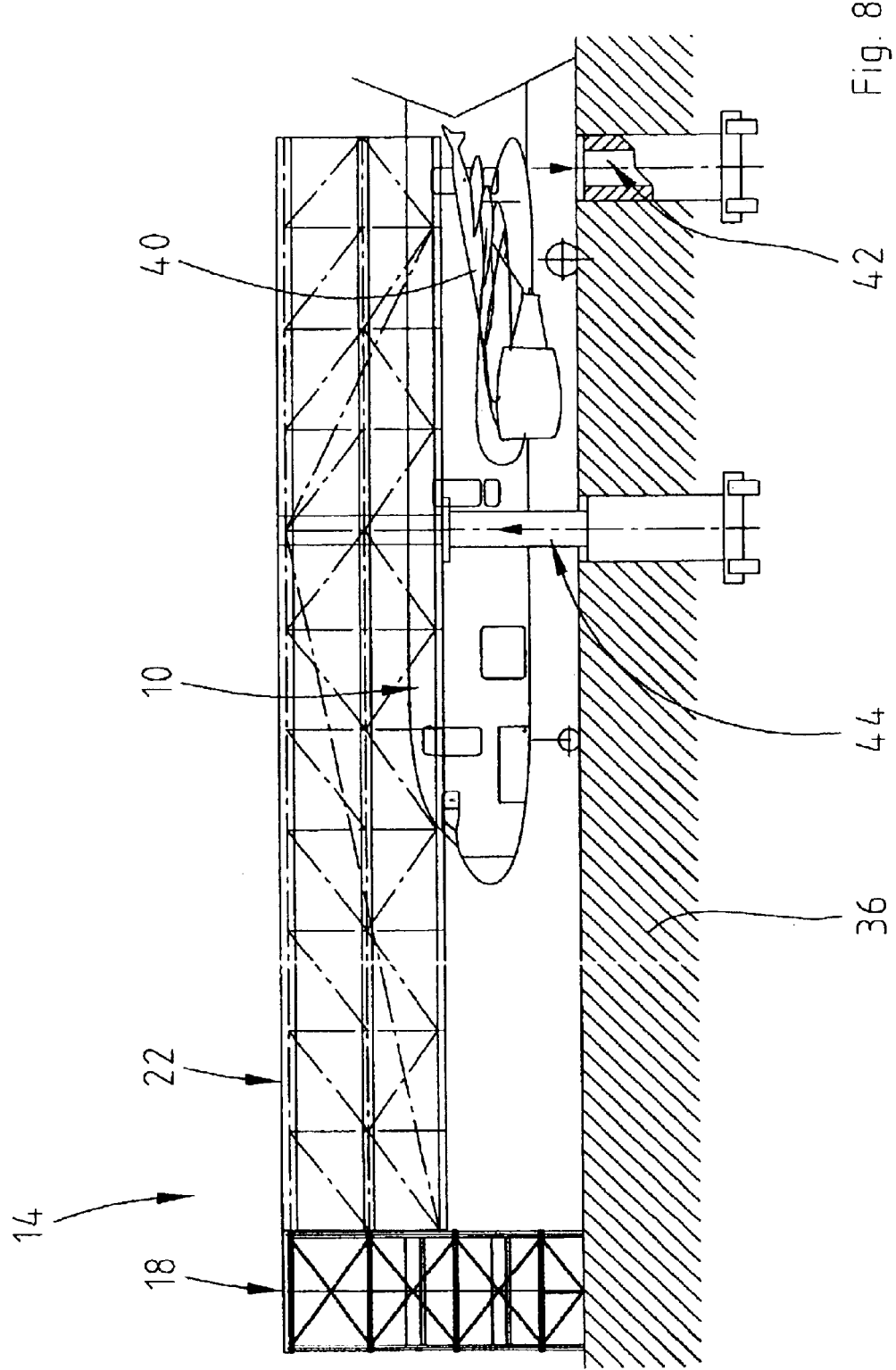
FIGS. 8 to 11 show different phases of docking an aircraft in the dock unit according to FIG. 7.
Figure 9:
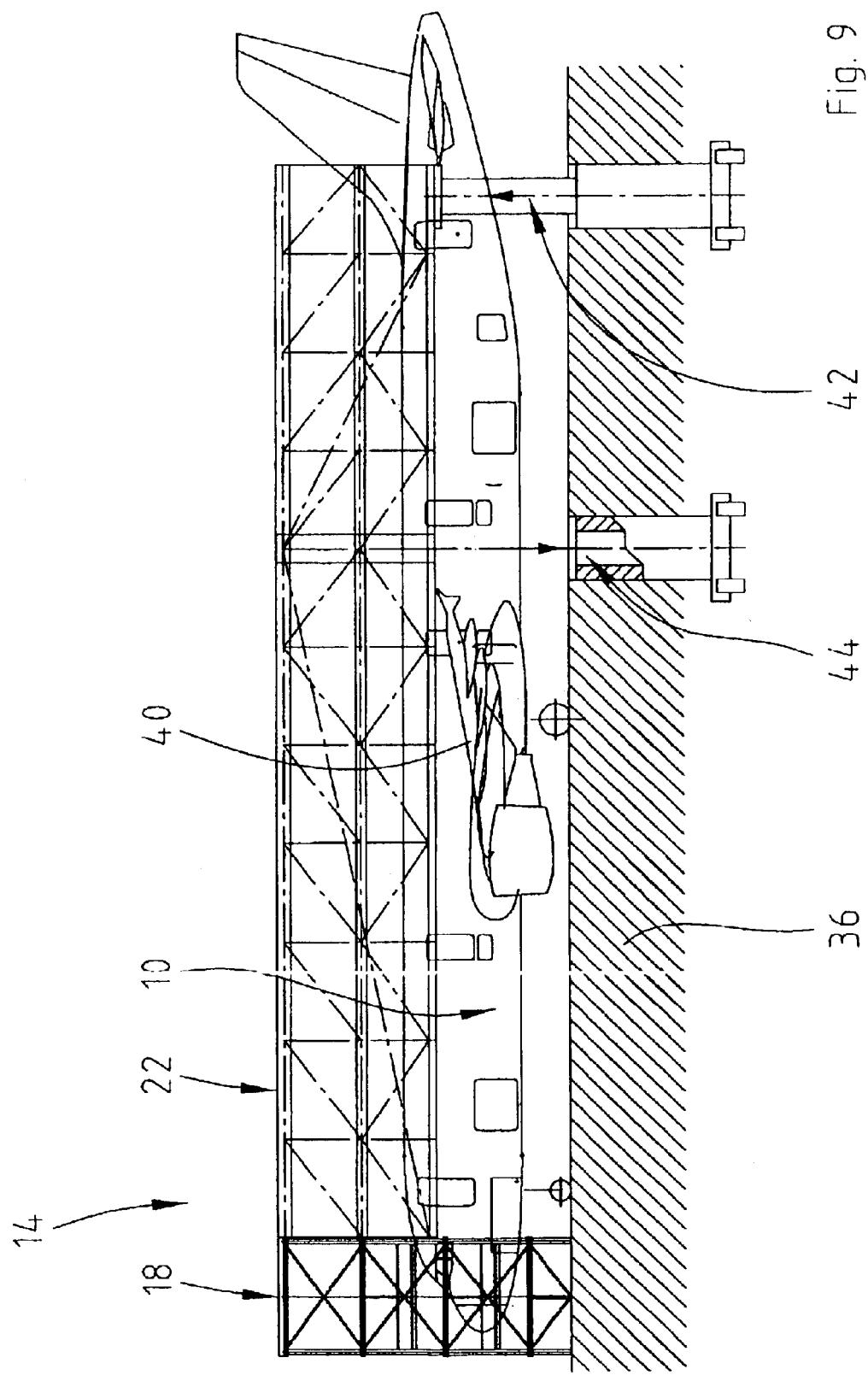
Figure 10:
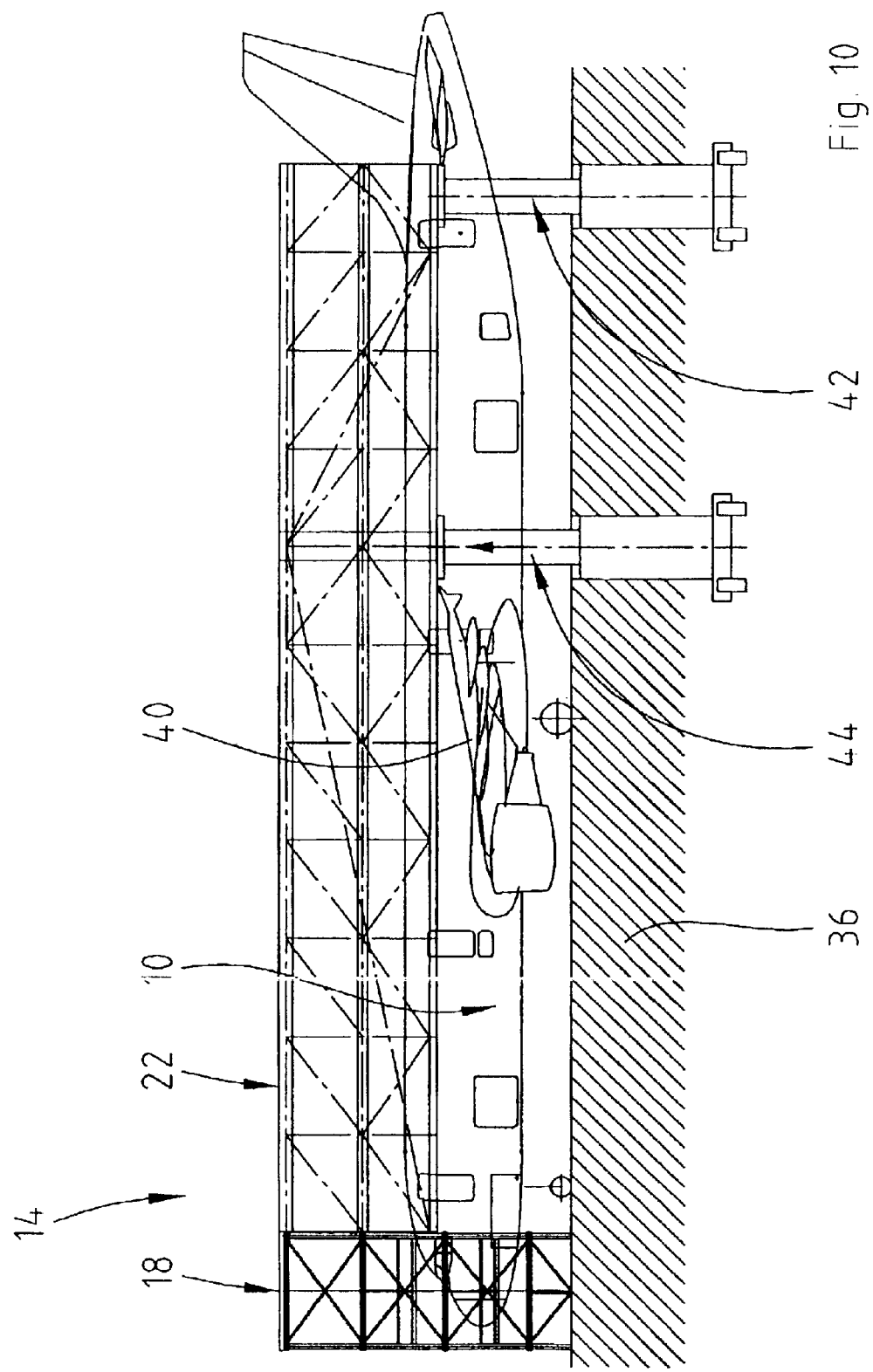
Figure 11:
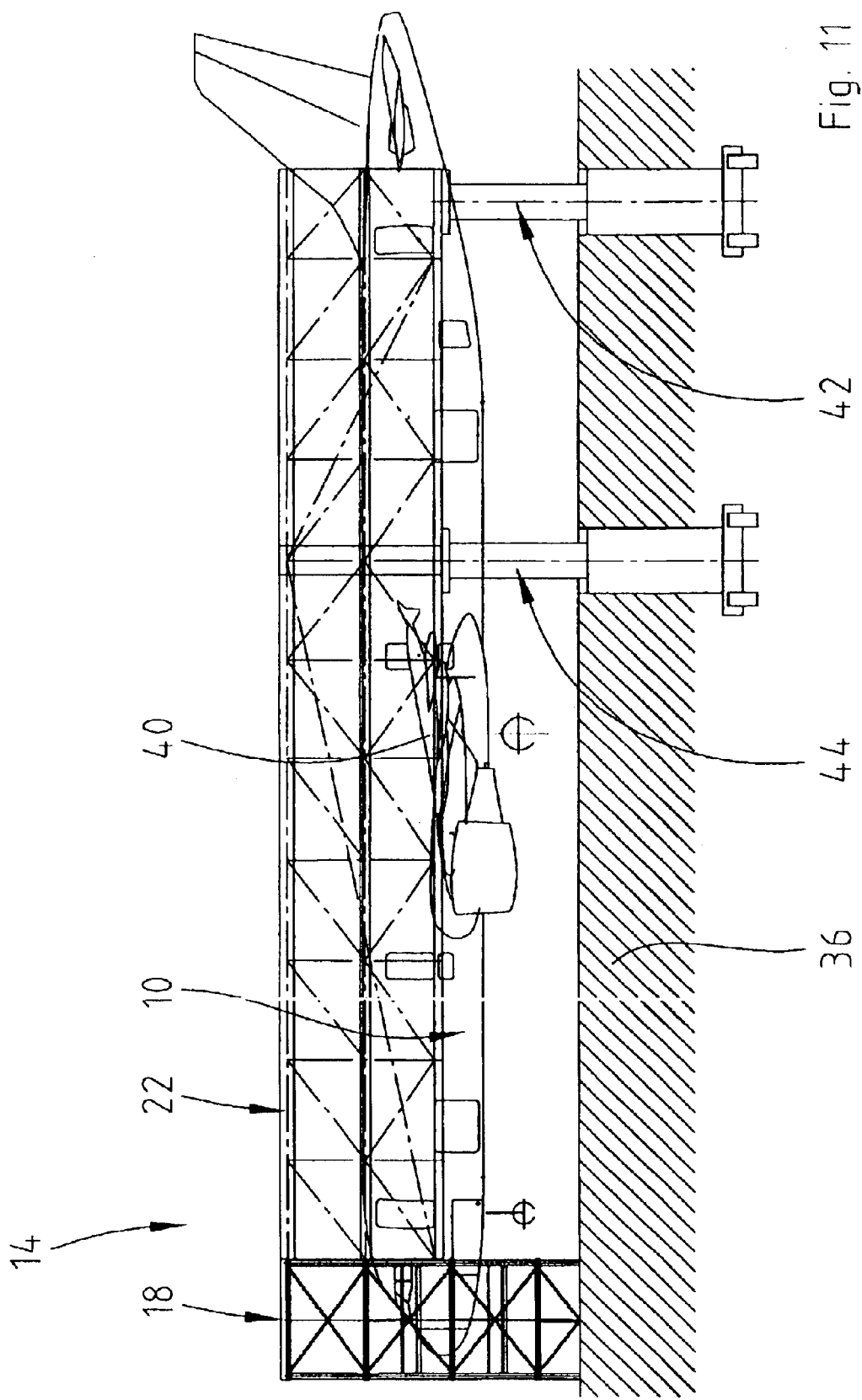

In the embodiment according to FIG. 7, elements of the dock unit 14 which have already been explained above with reference to FIGS. 1 to 6 are again denoted by the same reference characters and will not be described again in detail.

The hydraulic cylinders 46 are now recessed into the floor 36 of the maintenance hangar and the piston rods 48 engage via the footplates 50 attached to their ends against the underside of the dock section 22. By retraction of the piston rod 48 of one of the supports 42, 44 a temporary passage for a wing of an aircraft to be docked or undocked can again be created in a manner similar to that for the embodiment according to FIG. 1.

The upper faces of the hydraulic cylinders 46 are located below the floor surface and the footplates 50 therefore represent a flush continuation of the floor surface of the hangar in the fully retracted position of the piston rods 48.

Alternatively, the footplates 50 can be rigidly welded to the dock section 22, in which case the end faces of the piston rods 48, like the upper faces of the hydraulic cylinders 46, are flush with the floor surface when the piston rods are fully retracted.

Figure 12:
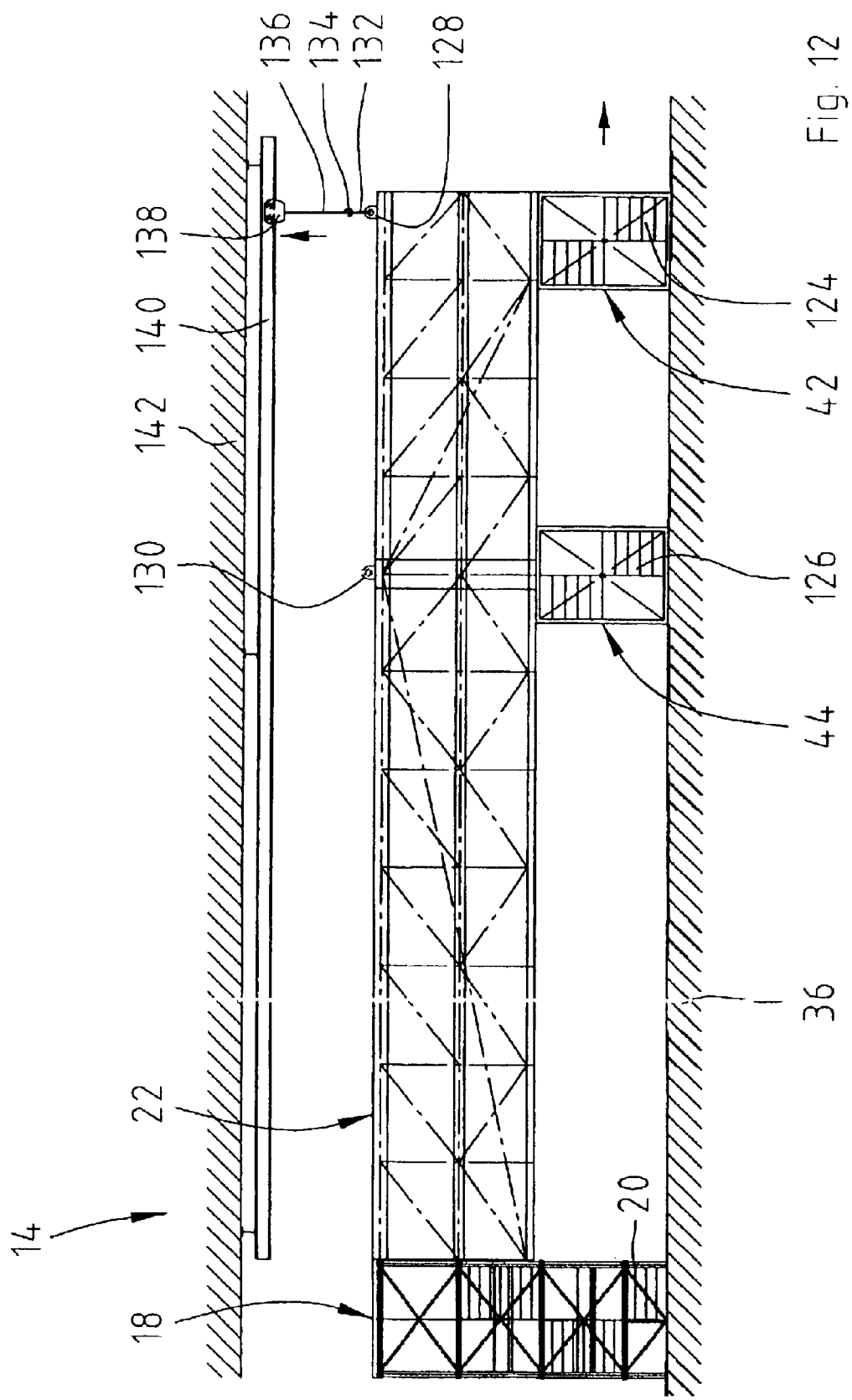
FIG. 12 shows a similar view to FIG. 1, in which the mechanical parts of a third embodiment of a dock unit are shown.
Figure 13:
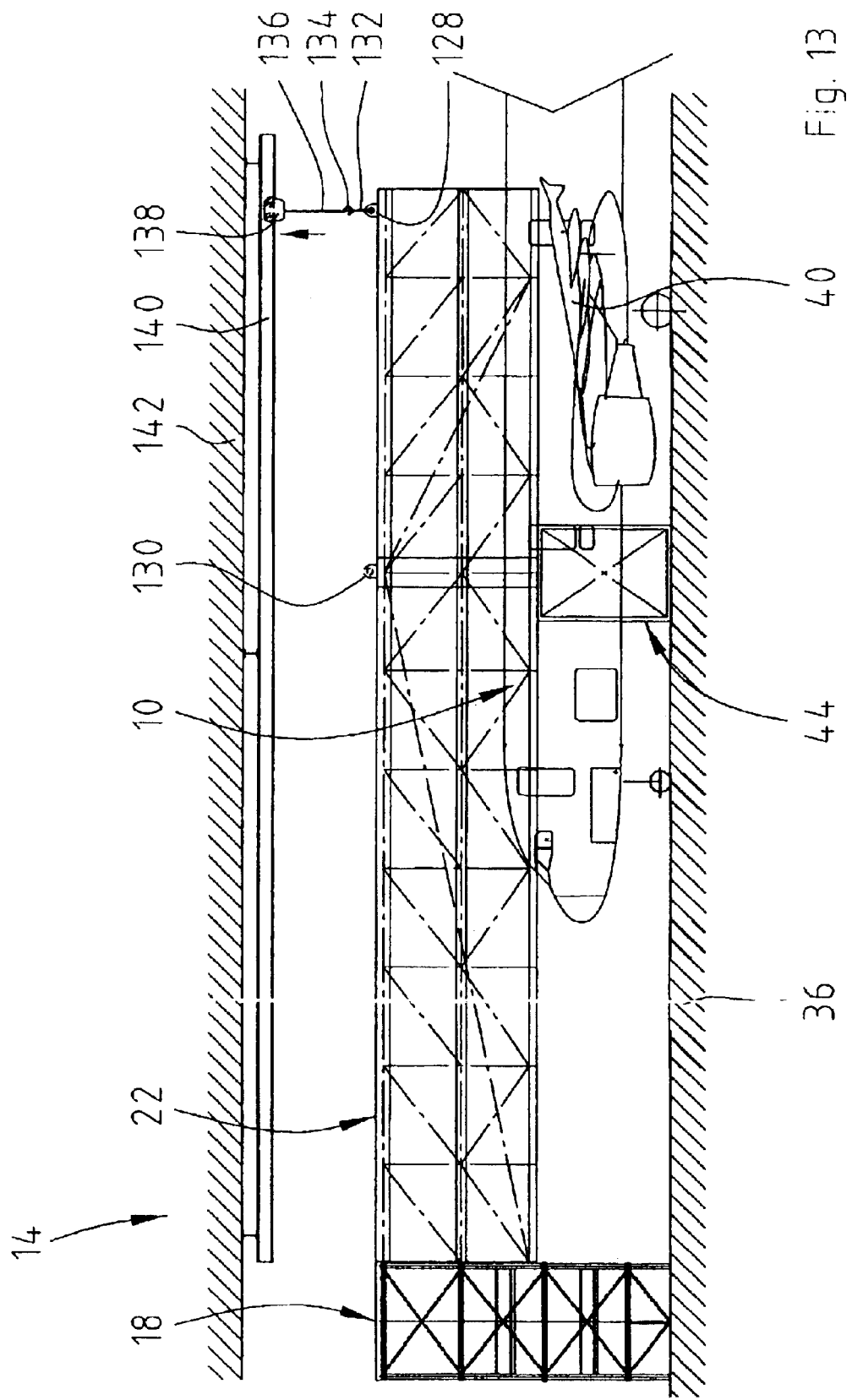
FIGS. 13 to 16 show different phases of docking an aircraft in a dock unit according to FIG. 12.
Figure 14:
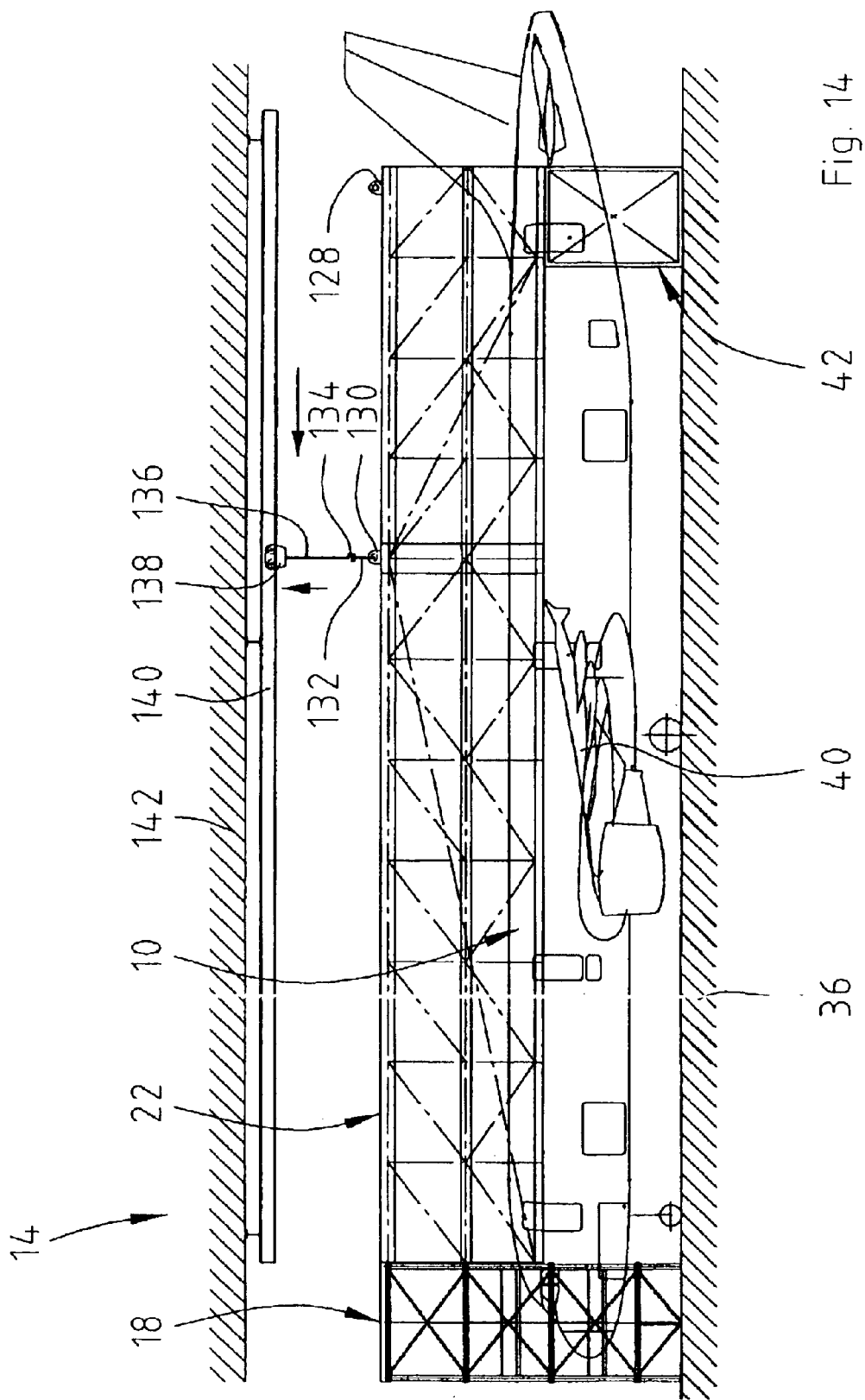
Figure 15:
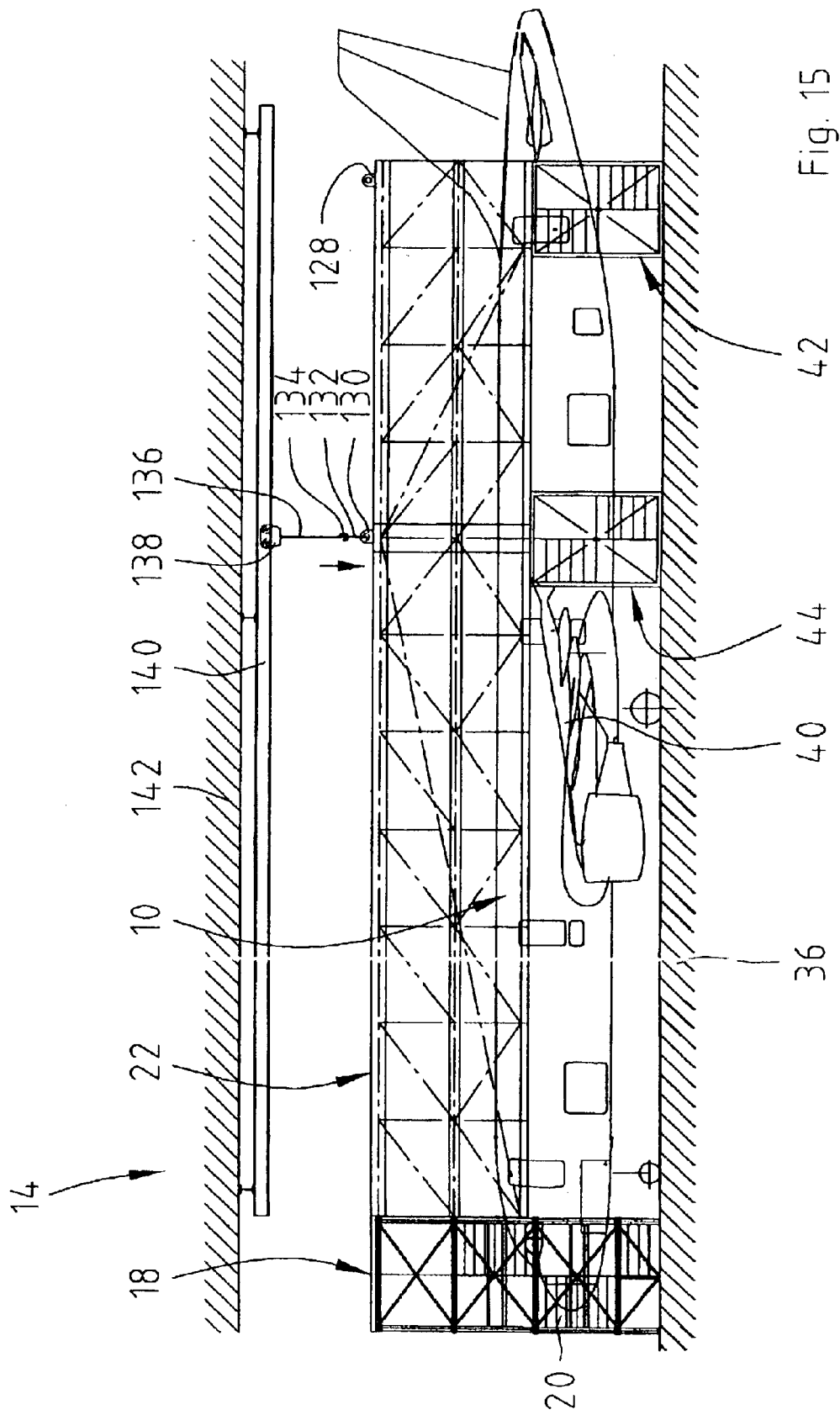
Figure 16:
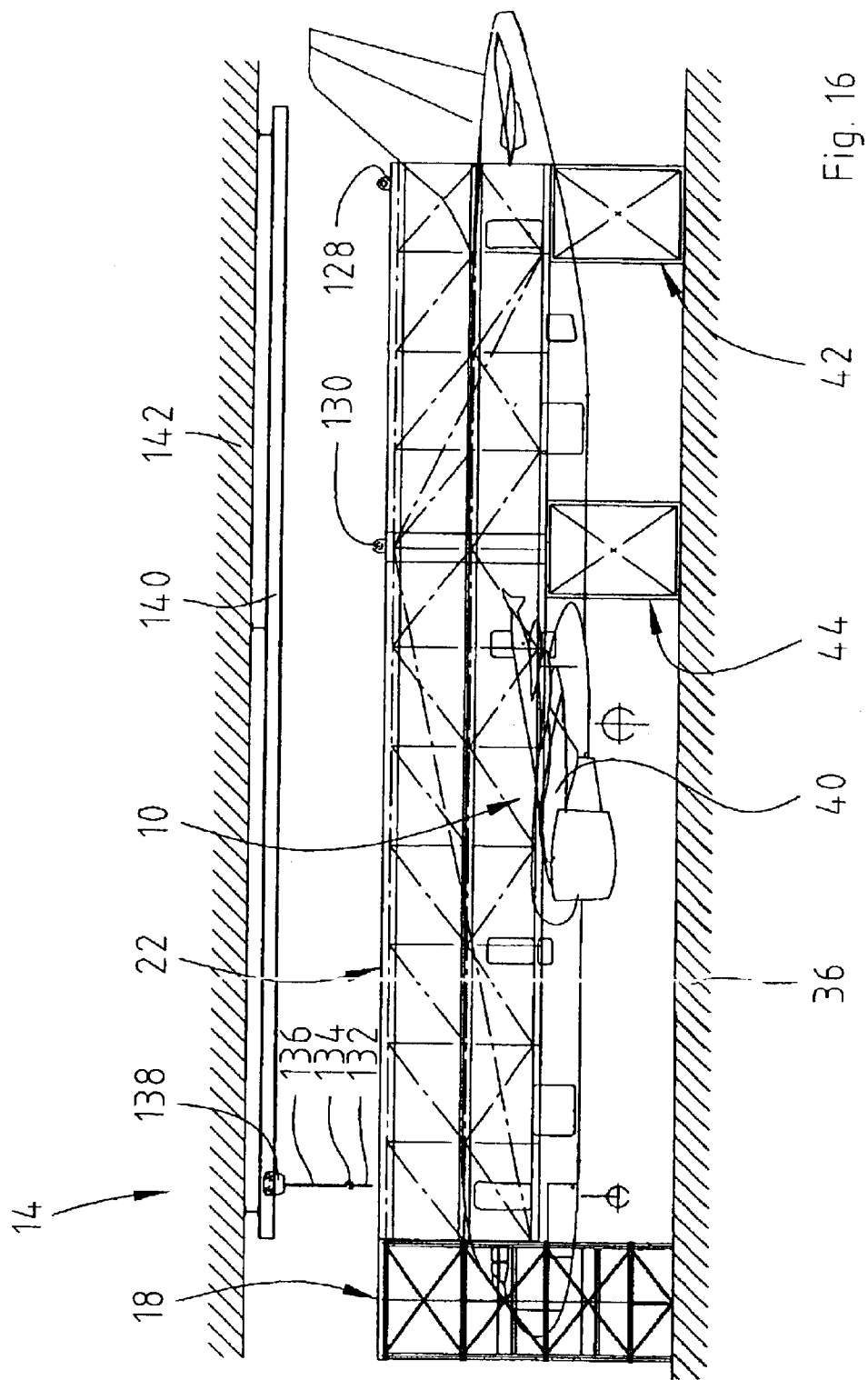
Figure 17:
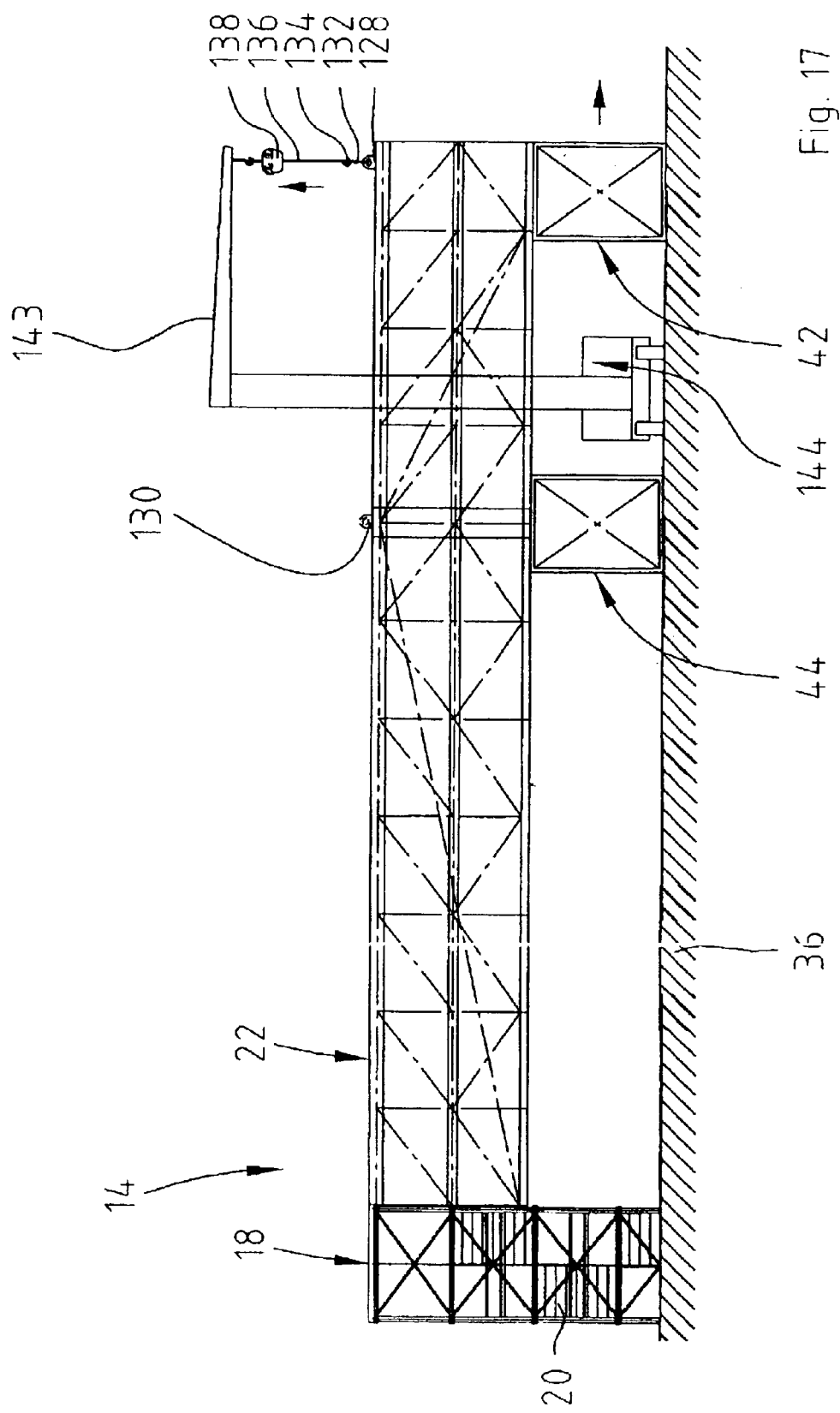
FIG. 17 shows a similar view to FIG. 1, in which a fourth embodiment of a maintenance dock is shown.
Figure 18:
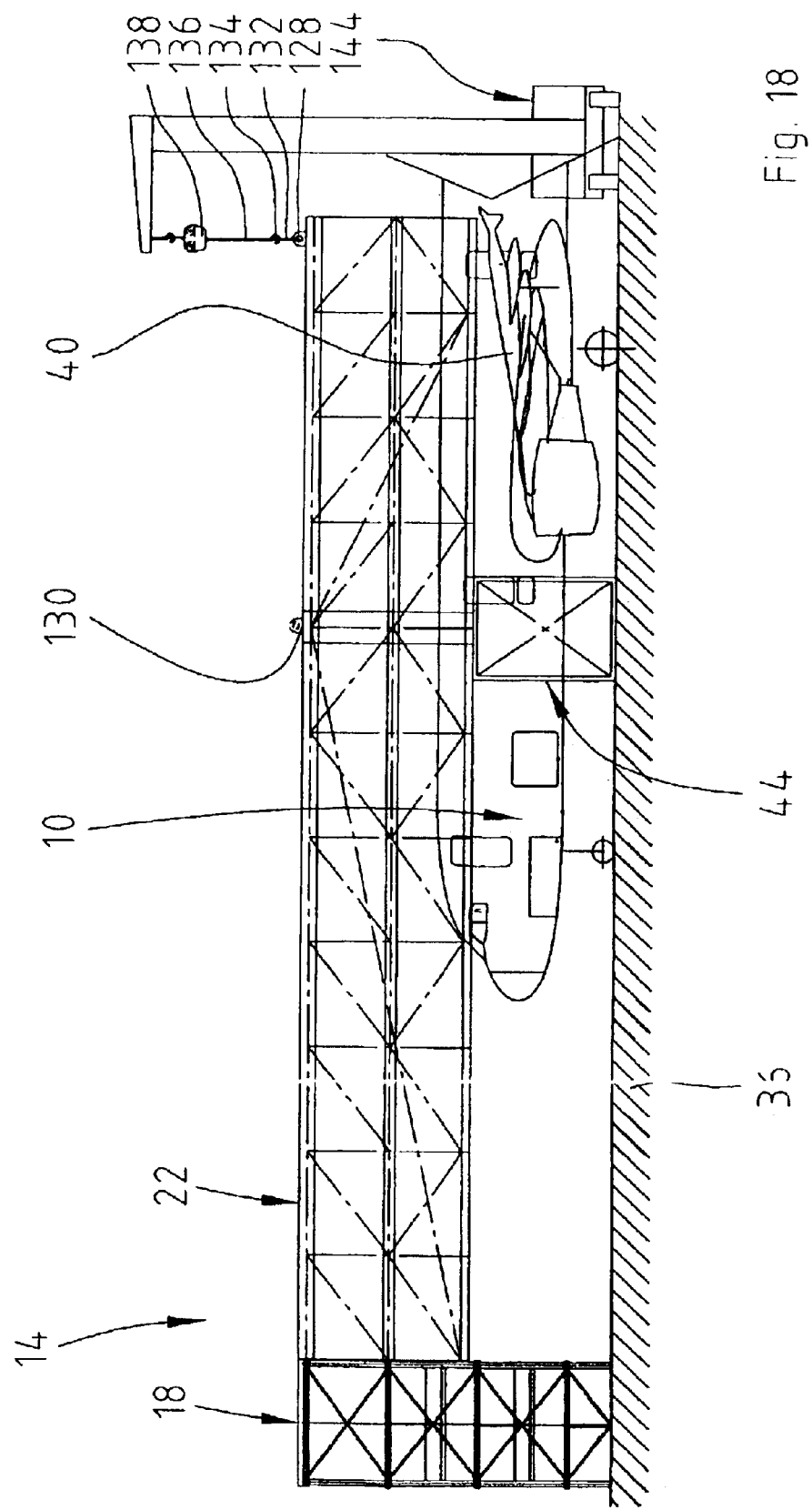
FIGS. 18 to 21 show different phases of docking an aircraft in the dock unit according to FIG. 17.
Figure 19:
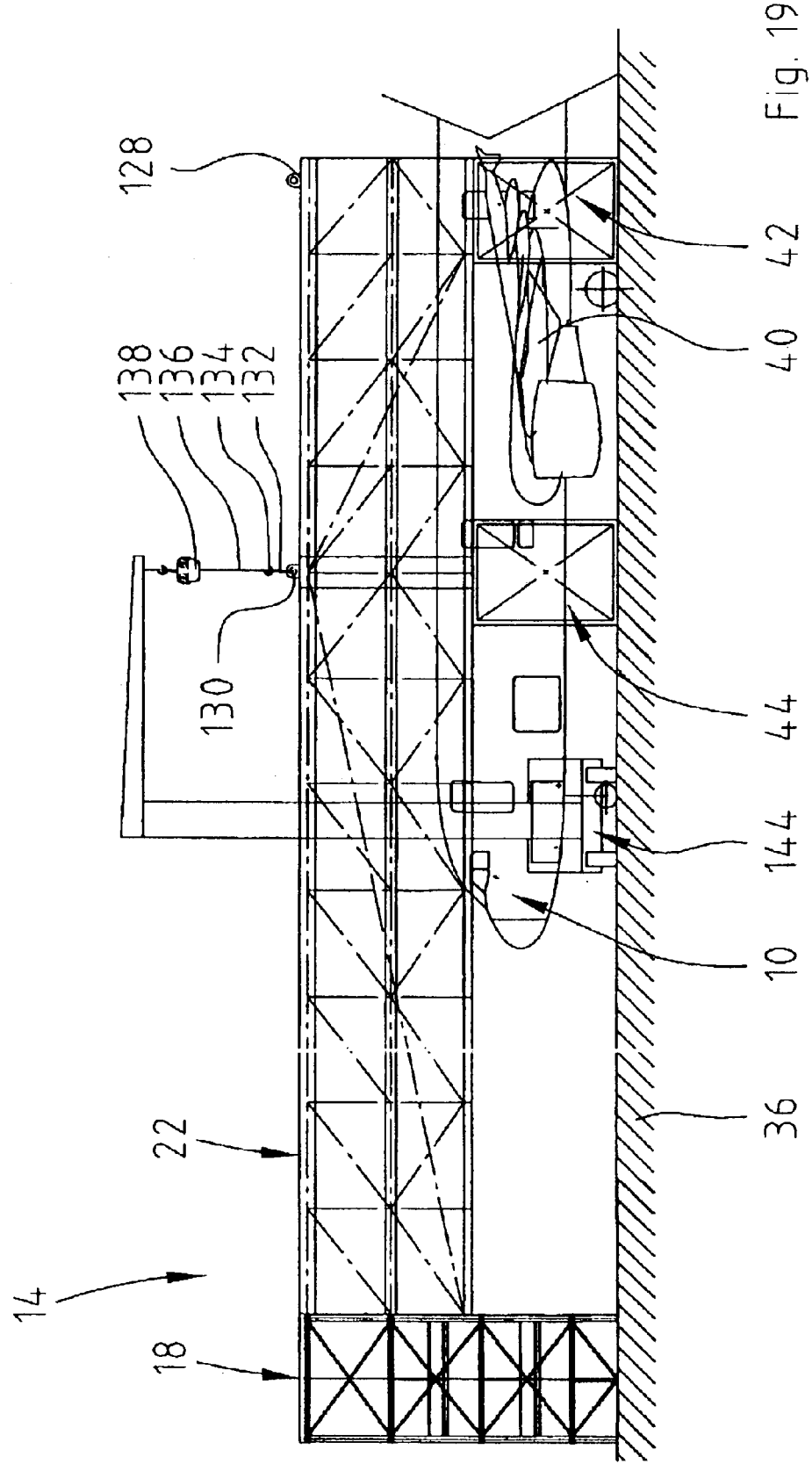
Figure 20:
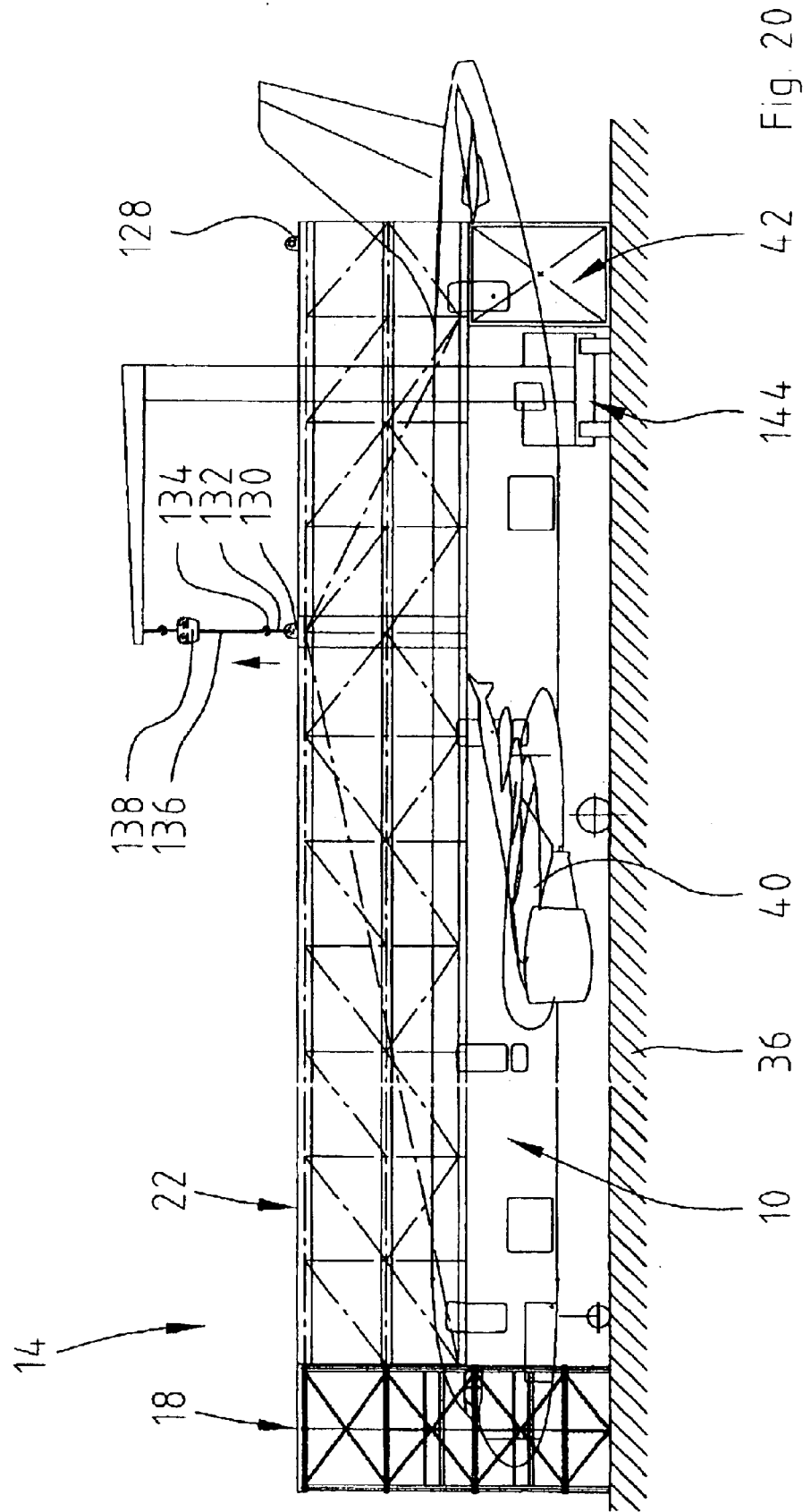
Figure 21:
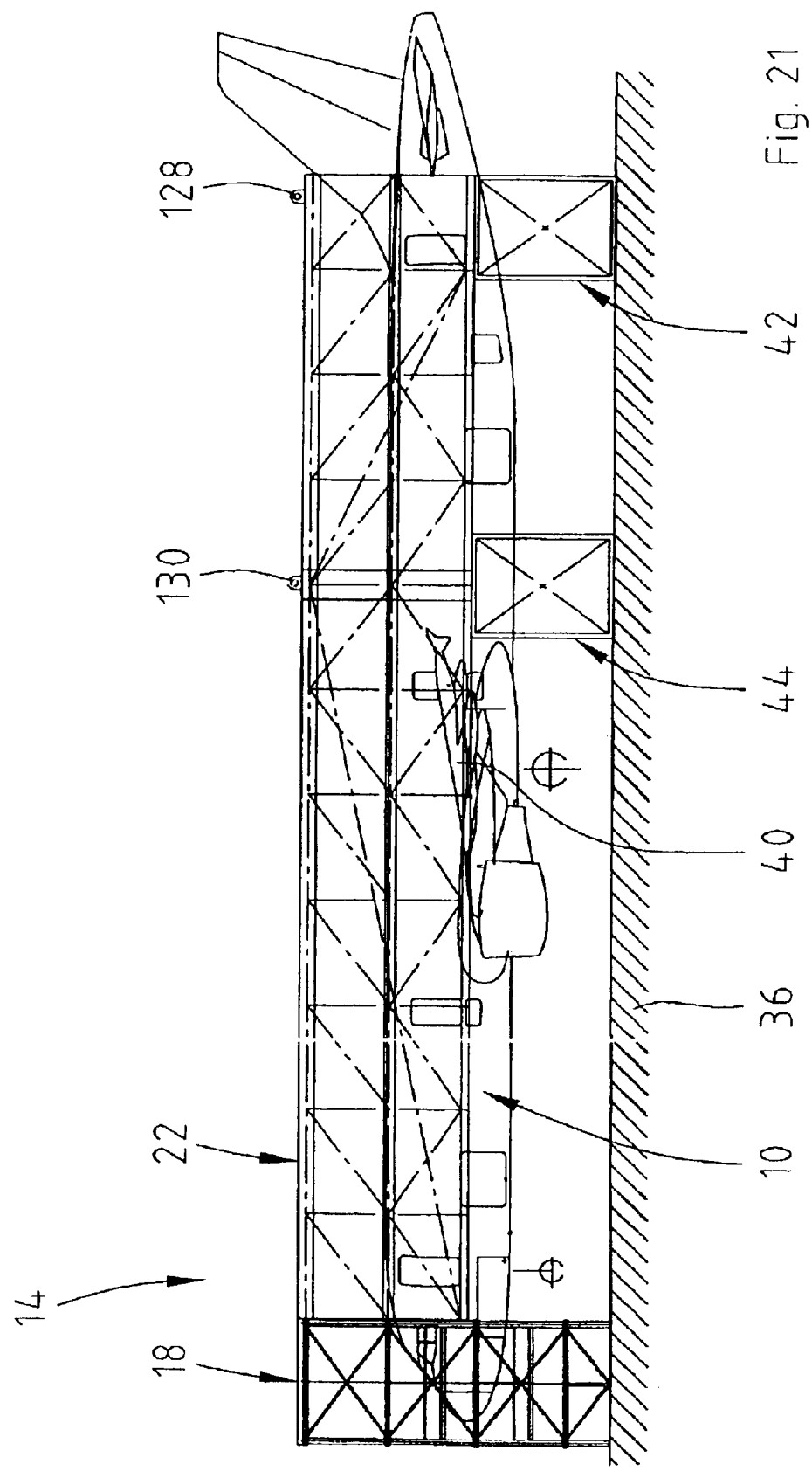
Figure 22:
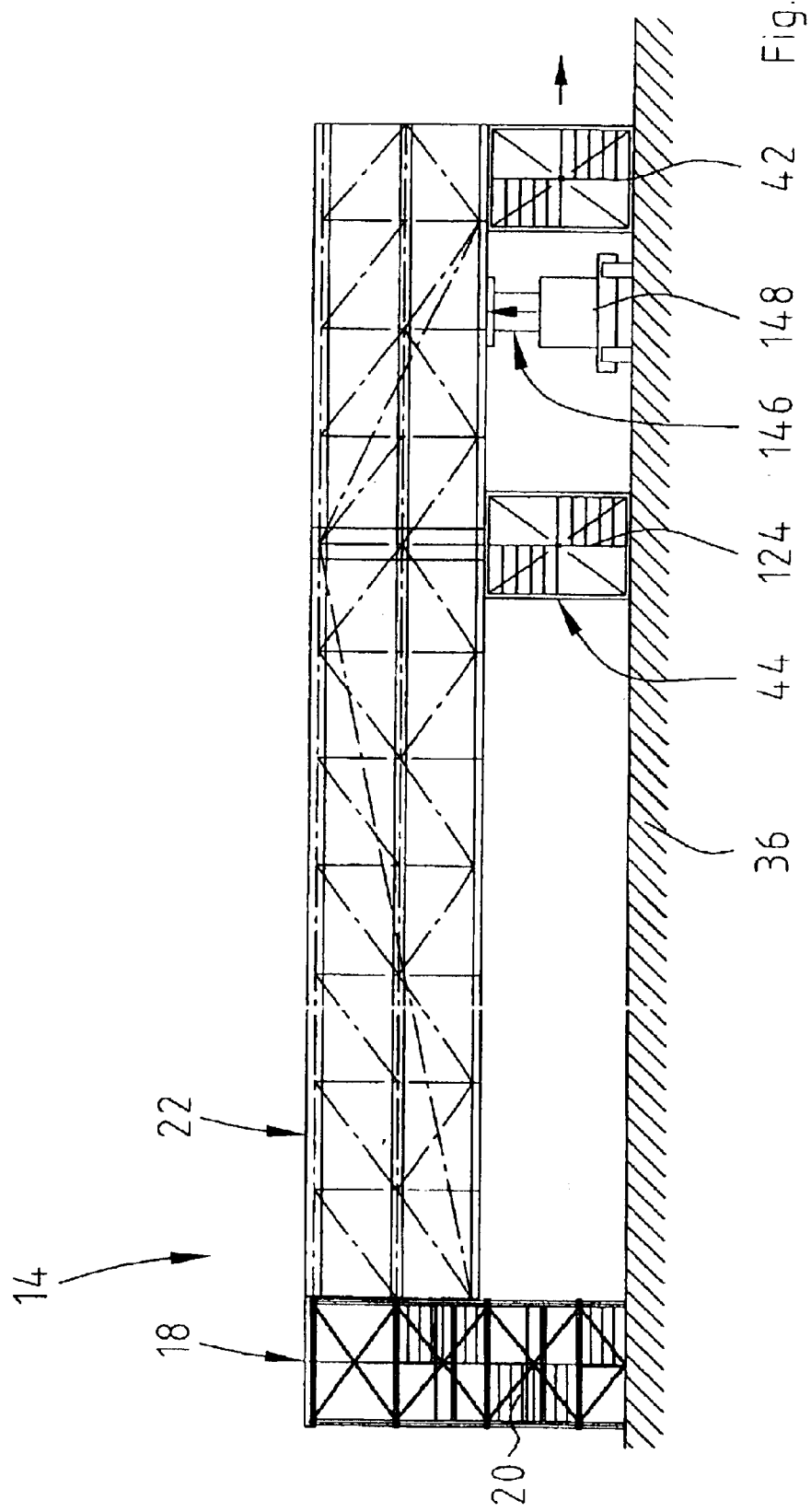
FIG. 22 shows a similar view to FIG. 1, in which the mechanical parts of a fifth embodiment of a dock unit are shown.
Figure 23:
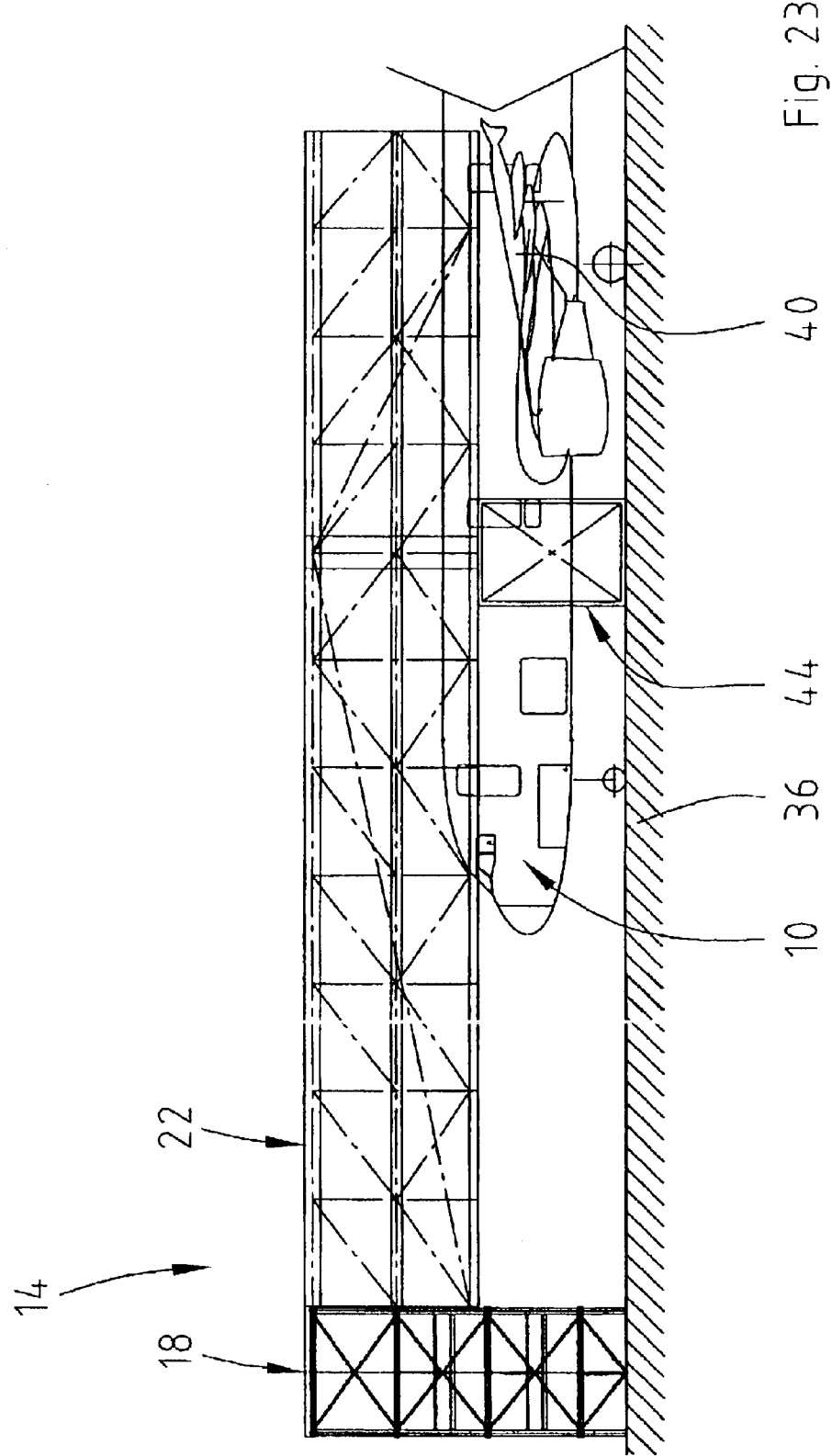
FIGS. 23 to 26 show different phases of docking an aircraft in the dock unit according to FIG. 22.
Figure 24:
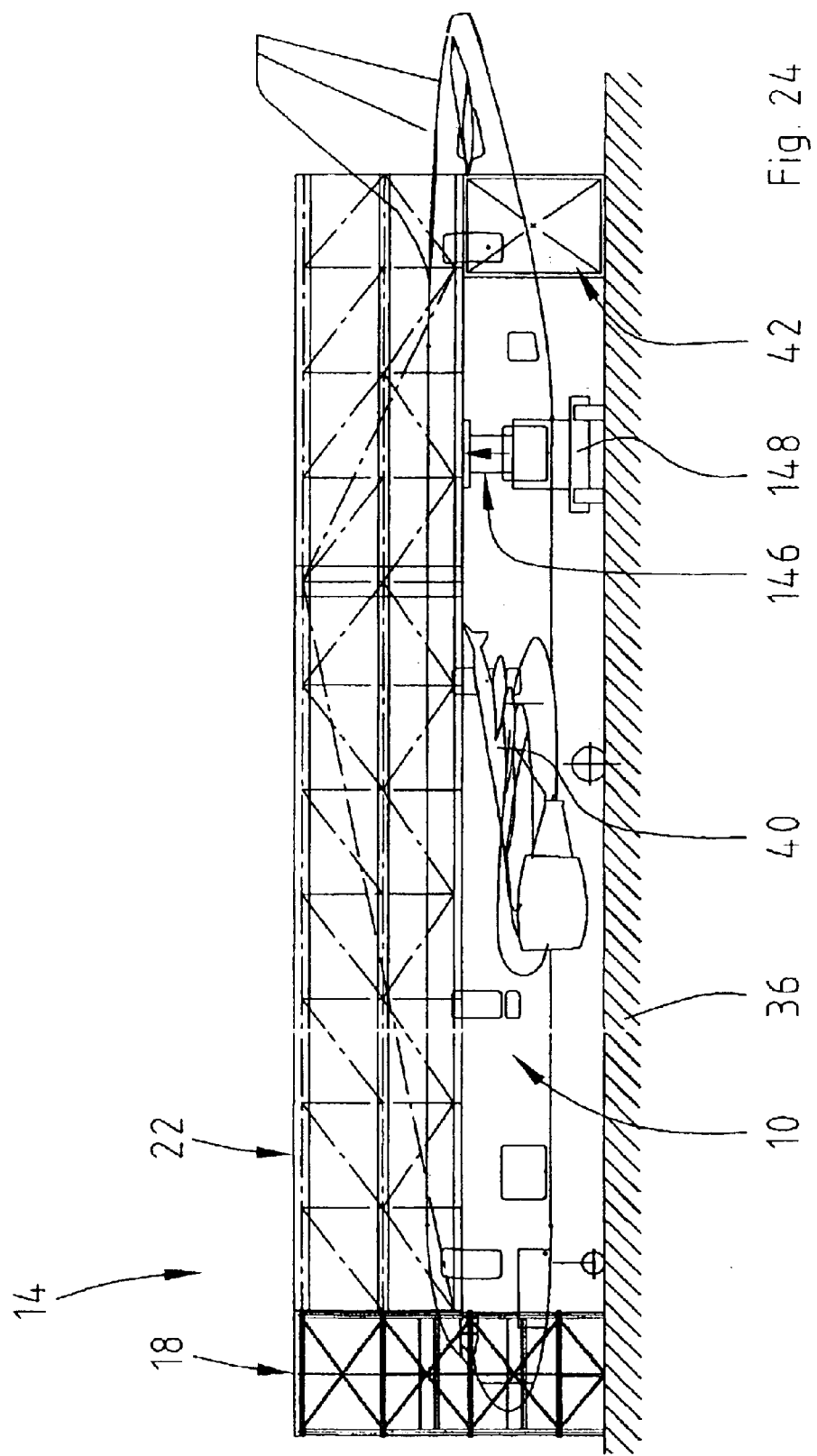
Figure 25:
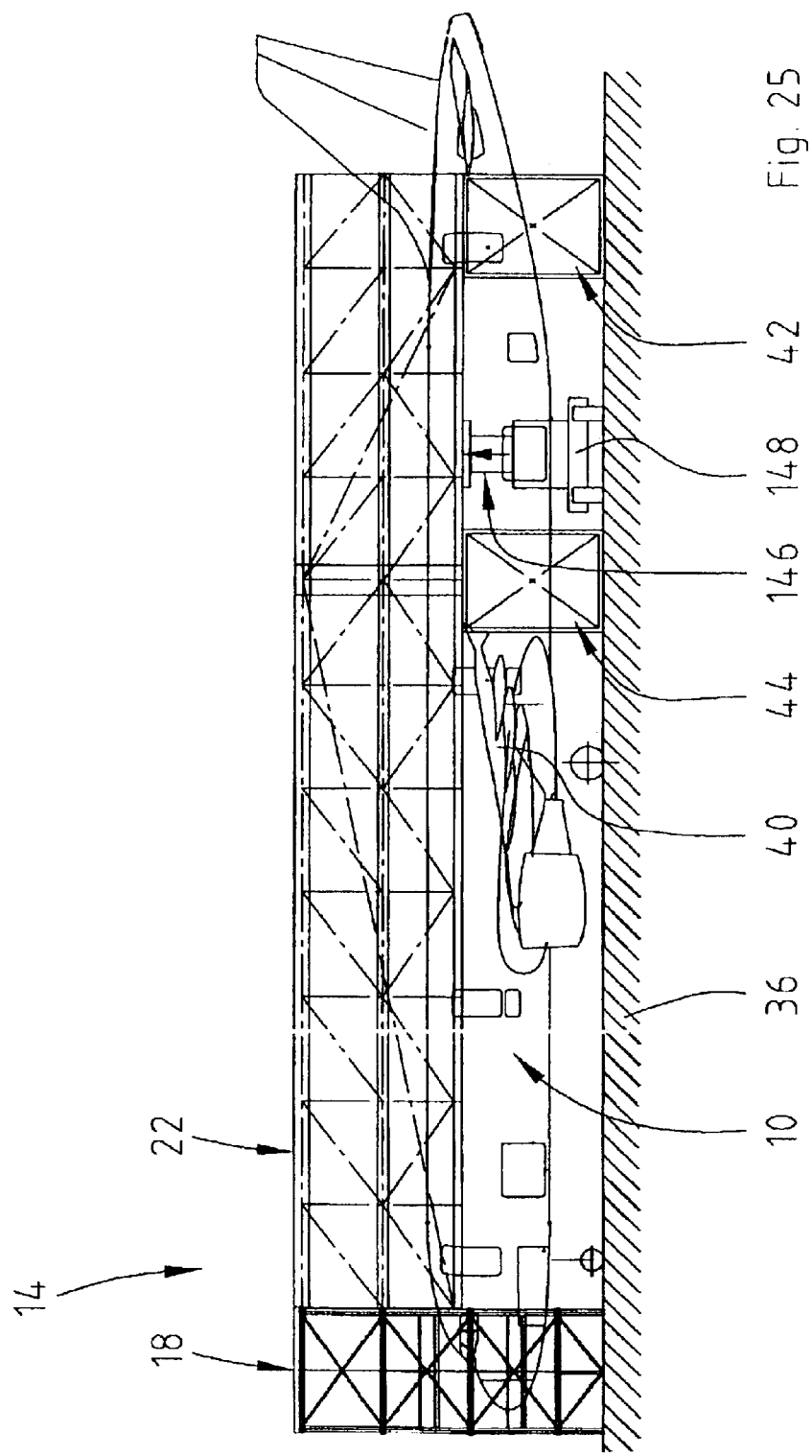
Figure 26:
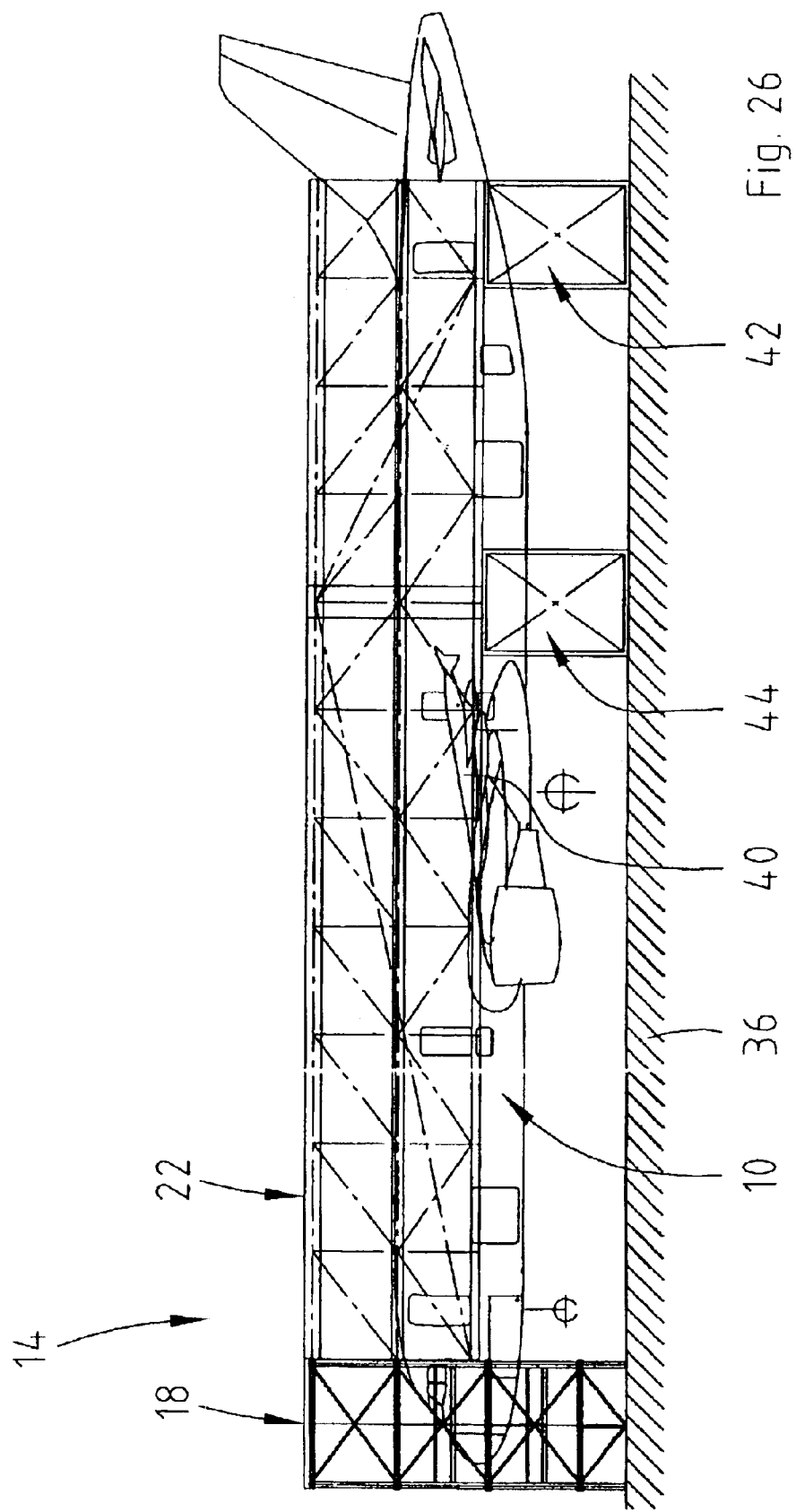

In the embodiment according to FIG. 12, both the outer support 42 and the inner support 44 are configured as small lattice towers which co-operate with the underside of the dock section 22. Inside the supports 42, 44 further stairways 124, 126 are shown, via which direct access from the floor level of the maintenance hangar is now made possible at the corresponding points of the dock section 22.

On the upper face of the dock section 22, retaining eyes 128, 130 are welded to the upper main beam 28 in alignment in the longitudinal direction with the supports 42, 44. A support cable 132, the ends of which are held by a crane hook 134 suspended on a crane cable 136, can be passed through said retaining eyes 128, 130. The crane cable 136 is carried by a cable drum, not shown in the drawing, which is arranged rotatably in a crane trolley 138. The latter is displaceable on a crane rail 140 in the longitudinal direction of the dock unit 14. The crane rail 140 is firmly connected at suitable points to the roof structure of the maintenance hangar indicated schematically at 142. The roof structure 142 can itself take the form of a lattice strut structure.

If the dock section 22 is raised by the retaining eye 128 by means of the crane cable 136, the support 42 can be raised somewhat from the floor by means of a suitable transport device, e.g. a forklift truck, and parked at a remote point, e.g. outside the maintenance hangar.

The supporting force contributed by the support 42 is now provided via the ceiling crane. An aircraft to be docked can now be moved into the dock unit until its wing 40 is directly in front of the inner support 44. The support 42 is now returned to its place by the forklift truck or the like and the crane cable 136 is unwound so that the free end of the dock section 22 is again supported by the support 42.

The crane trolley 138 is now moved to the retaining eye 130 which, as described above, is connected to the crane cable 136. The crane cable is wound on to the drum, removing the load pressure from the support 44. The latter can now be removed by the transport vehicle, e.g. transversely (perpendicularly behind the plane of projection of the drawing) and to the left, into an area which is located ahead of the wing with the aircraft fully docked. In this way, a passage is again created in the area of the support 44. The ceiling crane temporarily takes over the function of supporting the dock section 22 at that point.

The aircraft is now moved to the fully docked position.

The support 42 is now laid down so that one of its lateral bounding faces is at the bottom. In this orientation, its height is lower and it can be moved to the outside (to the right in the drawing) under the wing of the aircraft. The support 42 is then tilted back to the vertical orientation and placed from the side under the dock section 22. The crane cable 136 is now unwound and the support 44 resumes its supporting function.

In applications in which the support 42 alone is sufficient to fully support the dock section 22, the support 44 can be left in the parking area located on the left and behind the plane of projection in FIG. 12. In this case, the support 44 is used again only when the aircraft is undocked to the point where the rear edge of its wing is a short way in front of the support 42. The support 44 is then pushed back into its place, the crane engaging with the retaining eye 130 in order somewhat to raise the dock section 22. The retaining eye 130 is then lowered and the crane unhooked therefrom. The support 42 is then removed as described above and the aircraft can be completely undocked.

The embodiment according to FIGS. 17 to 21 corresponds in terms of function to that the according to FIGS. 12 to 16, except that the crane is carried by means of an arm 143 by a vehicle 144 which can be driven on the floor 36 of the maintenance hangar.

The overhanging length of the arm 143 is greater than the width of the wings of the aircraft models to be maintained.

The embodiment according to FIGS. 22 to 26 corresponds in terms of its basic functions to that according to FIGS. 12 to 16, except that the temporary raising of the dock section 22 is effected not by using a crane but by using a support 146 of variable length fitted to a carriage 148, which support 146 includes a hydraulic cylinder or other lifting arrangement (threaded spindle, fluid cushion, etc.). This carriage can be placed in the vicinity of the support 42 or 44 in order to raise the dock section 22 at that point until the support 42 or 44 can be withdrawn from below the corresponding part of the dock section 42 or pushed in below same.

Apart from this manner of locally raising the dock section 22, the embodiment according to FIGS. 22 to 26 operates in the same way as that according to FIGS. 12 to 16.

Figure 27:
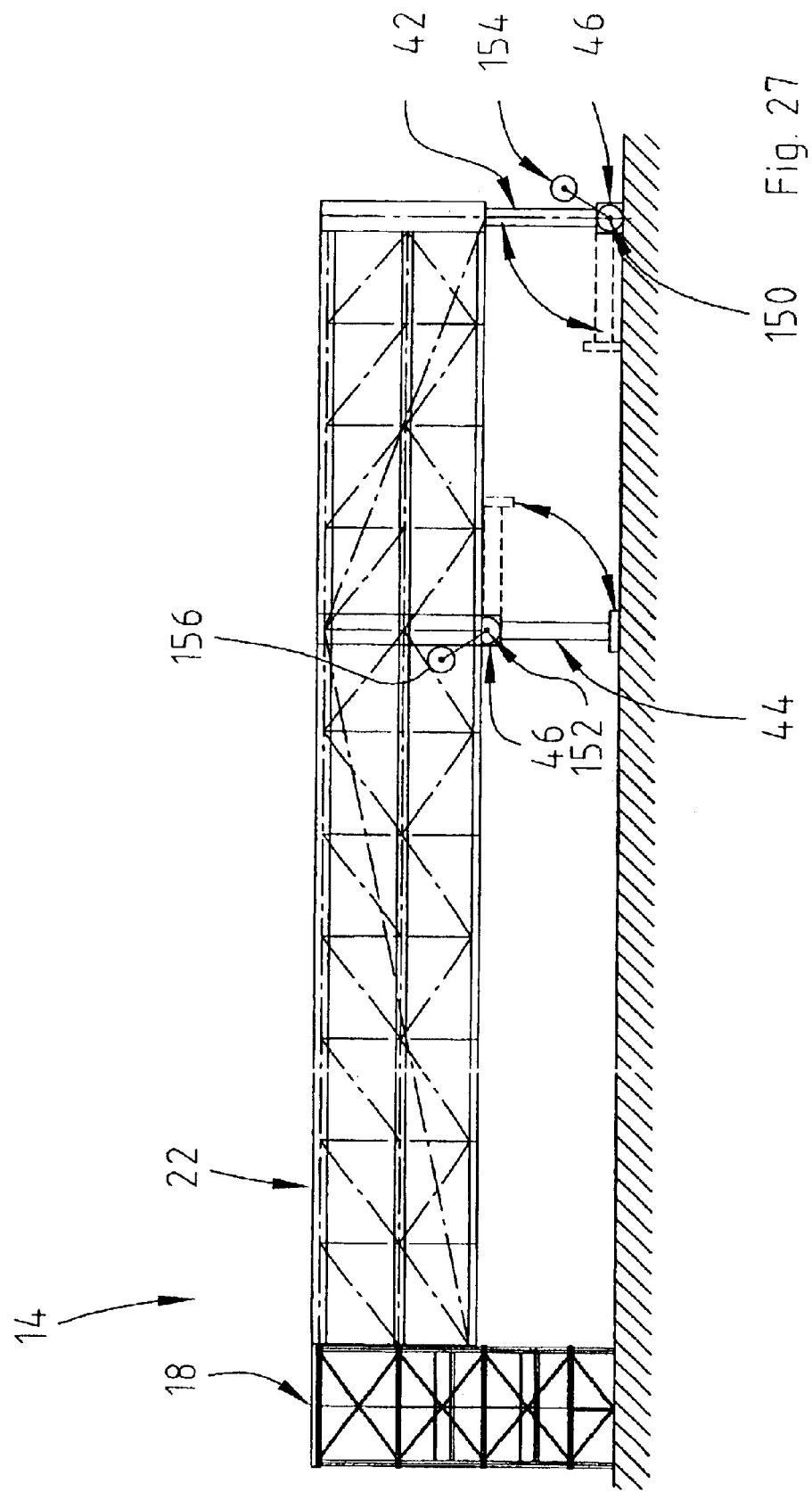
FIG. 27 shows a similar view to FIG. 1, in which the mechanical parts of a sixth embodiment of a dock unit are shown.

As shown in FIG. 27, a passage can be temporarily created at the supports 42 and 44 by pivoting the support about a horizontal axis perpendicular to the longitudinal axis of the dock section 22. Pivots for the supports 42 and 44 are shown at 150 and 152 respectively.

In the embodiment according to FIG. 27, it is assumed that the lattice structure of the dock section 22 is so rigid that it is sufficient to support the dock section 22 at its free end or in the vicinity of its center.

The supports 42 and 44 are then in each case carried by the piston rods of axially short hydraulic cylinders 46, the stroke of which is just sufficient to move the piston rod to the unloaded position or to press it firmly under the dock section 22 and move same to a predefined level.

The pivots 150, 152 for the supports 42, 44 can be located either on the dock section 22, as shown for the support 44, or near the floor 36 of the maintenance hangar, as shown for the support 42.

Motors 154, 156, which can be hydraulic motors or geared electric motors, are used to move the supports 42, 44 between the prop position indicated in the drawing by unbroken lines and the clearance position indicated in the drawing by broken lines.

With reference to FIGS. 1 to 27, various possibilities for moving the supports 42, 44 between a prop position and a clearance position have been described above. In addition, various possibilities have been indicated for locally replacing, if necessary, at least some of the forces supplied by the supports moved to the clearance position by a different arrangement, e.g. a crane.

It is self-evident that the above-described embodiments can also be combined.

In the above-described embodiments, the extensible supports 42, 44 were in each case provided in pairs.

Figure 28:
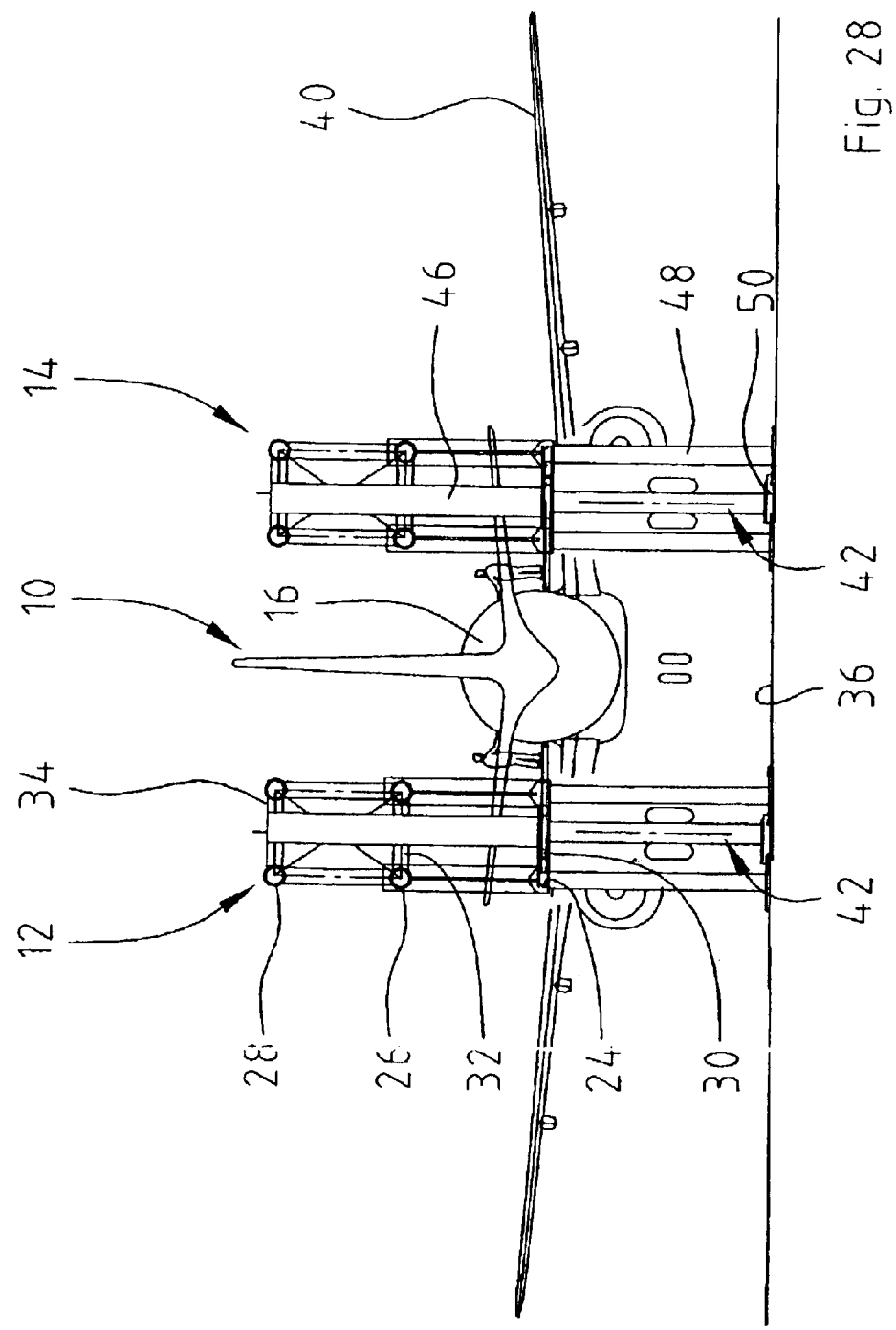
FIG. 28 shows a similar view to FIG. 6, in which, however, a further modified embodiment of the dock unit is shown.
Figure 29:
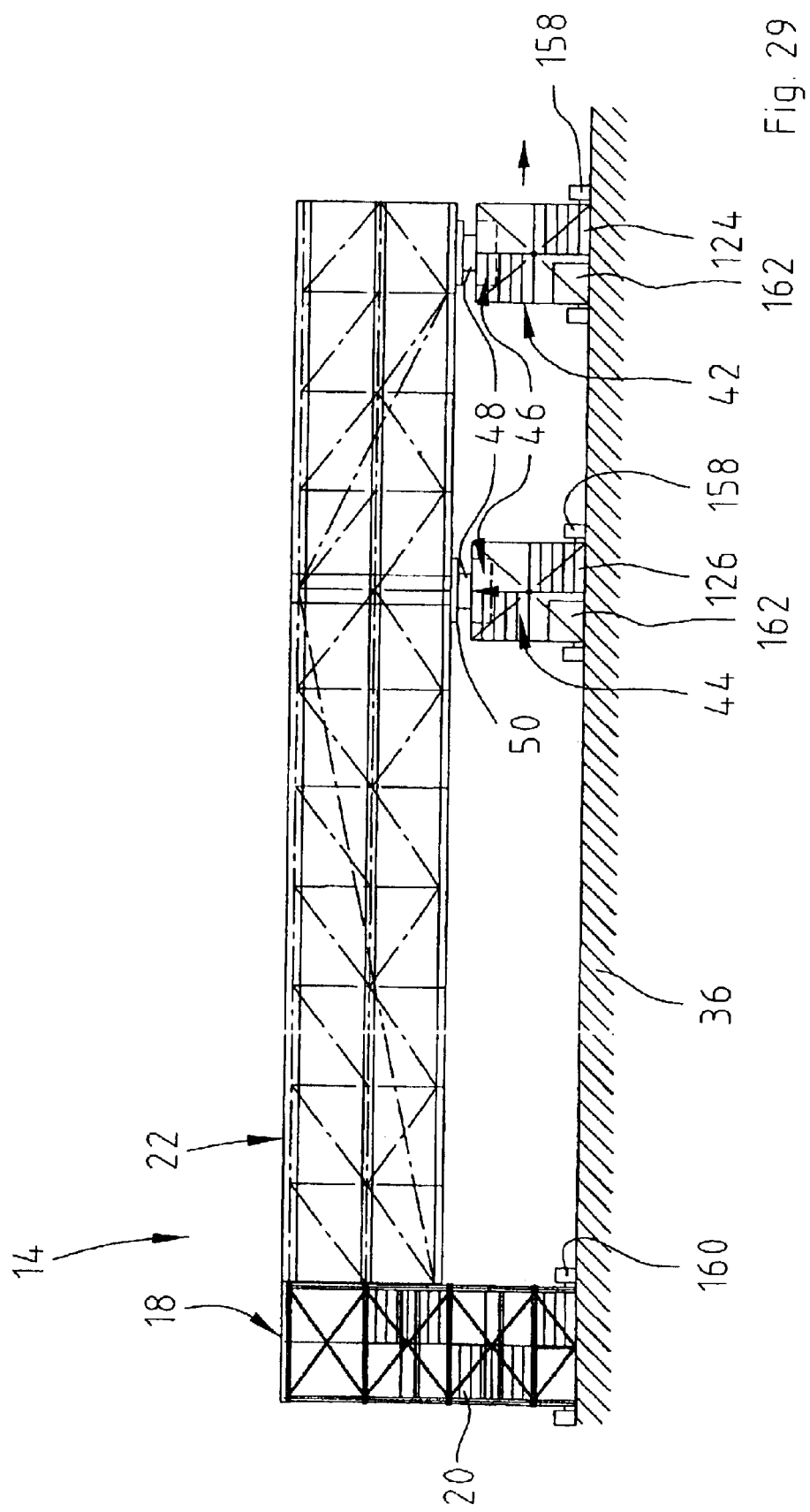
FIG. 29 shows a similar view to FIG. 1, the mechanical parts of a further modified dock unit being shown.
Figure 30:
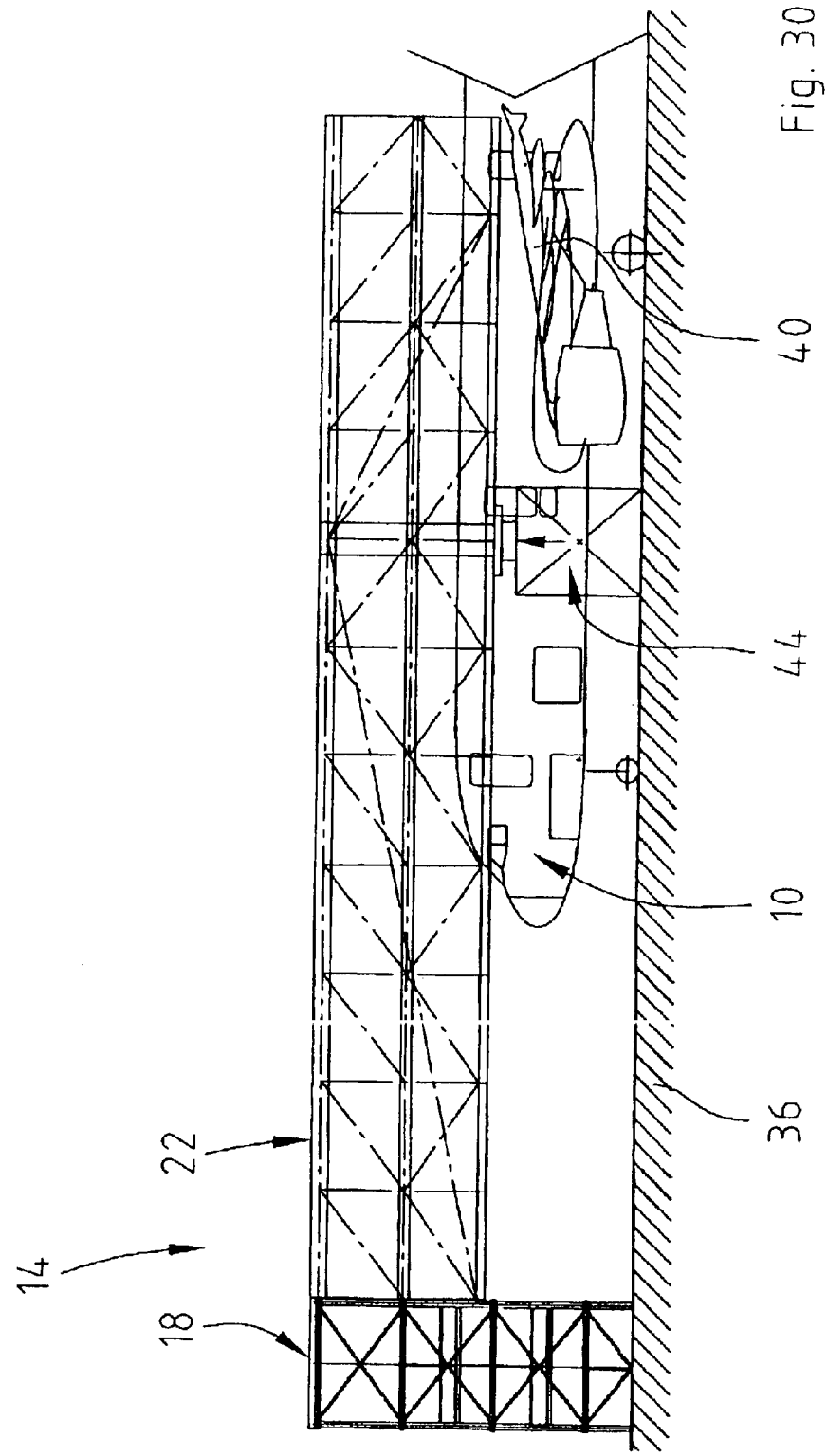
FIGS. 30 to 33 show different phases of docking an aircraft in the dock unit according to FIG. 29.
Figure 31:
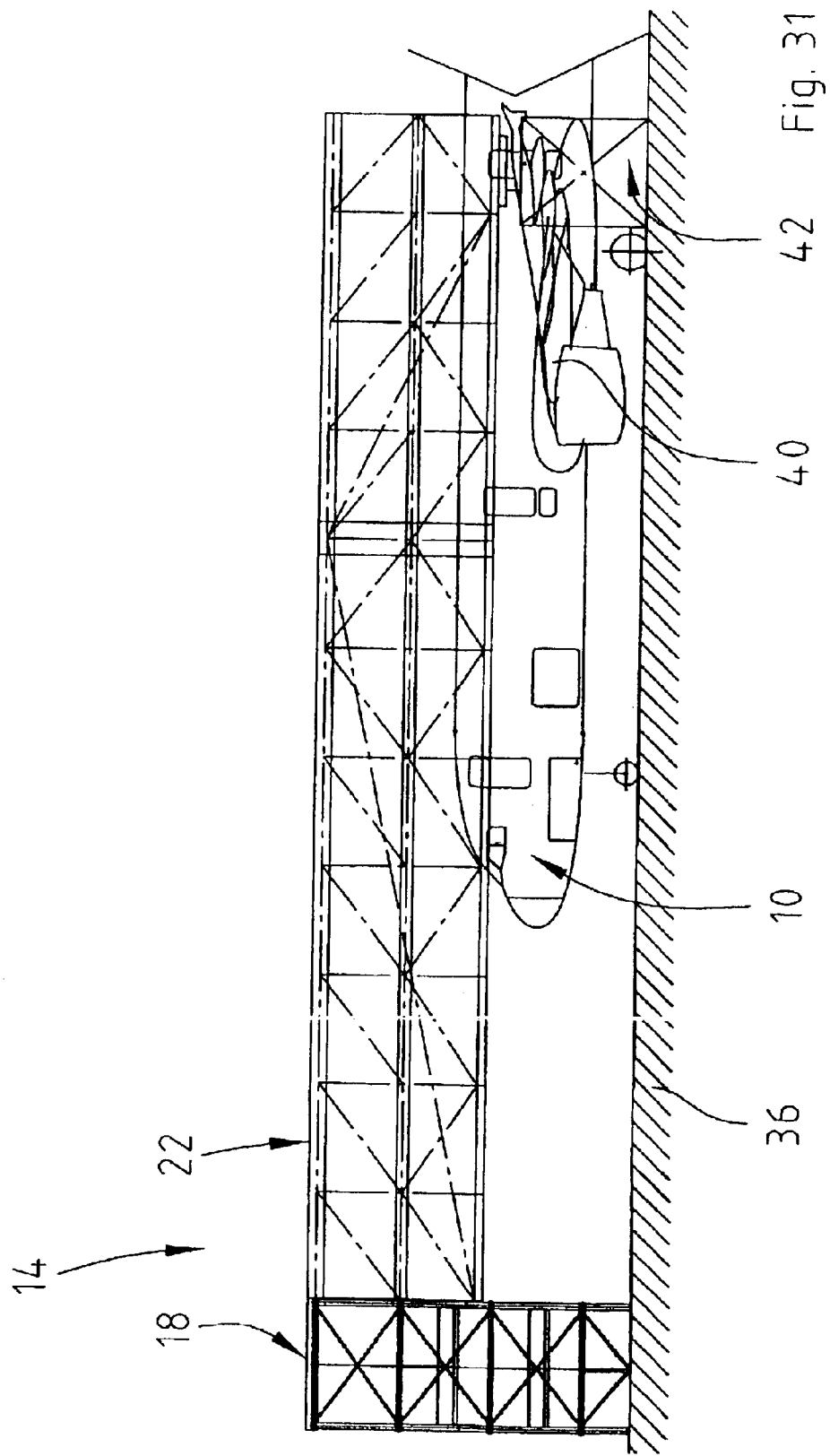
Figure 32:
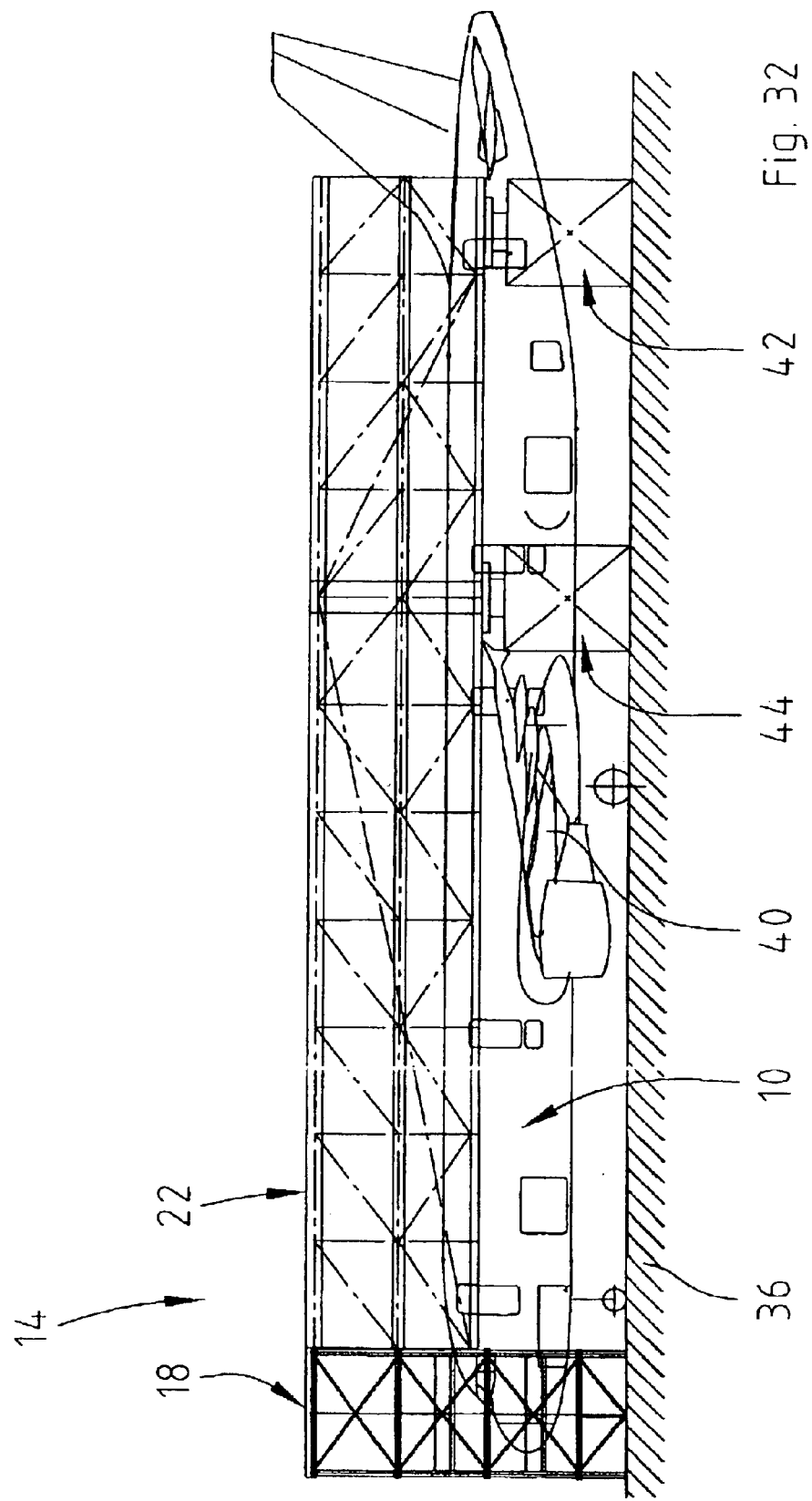
Figure 33:
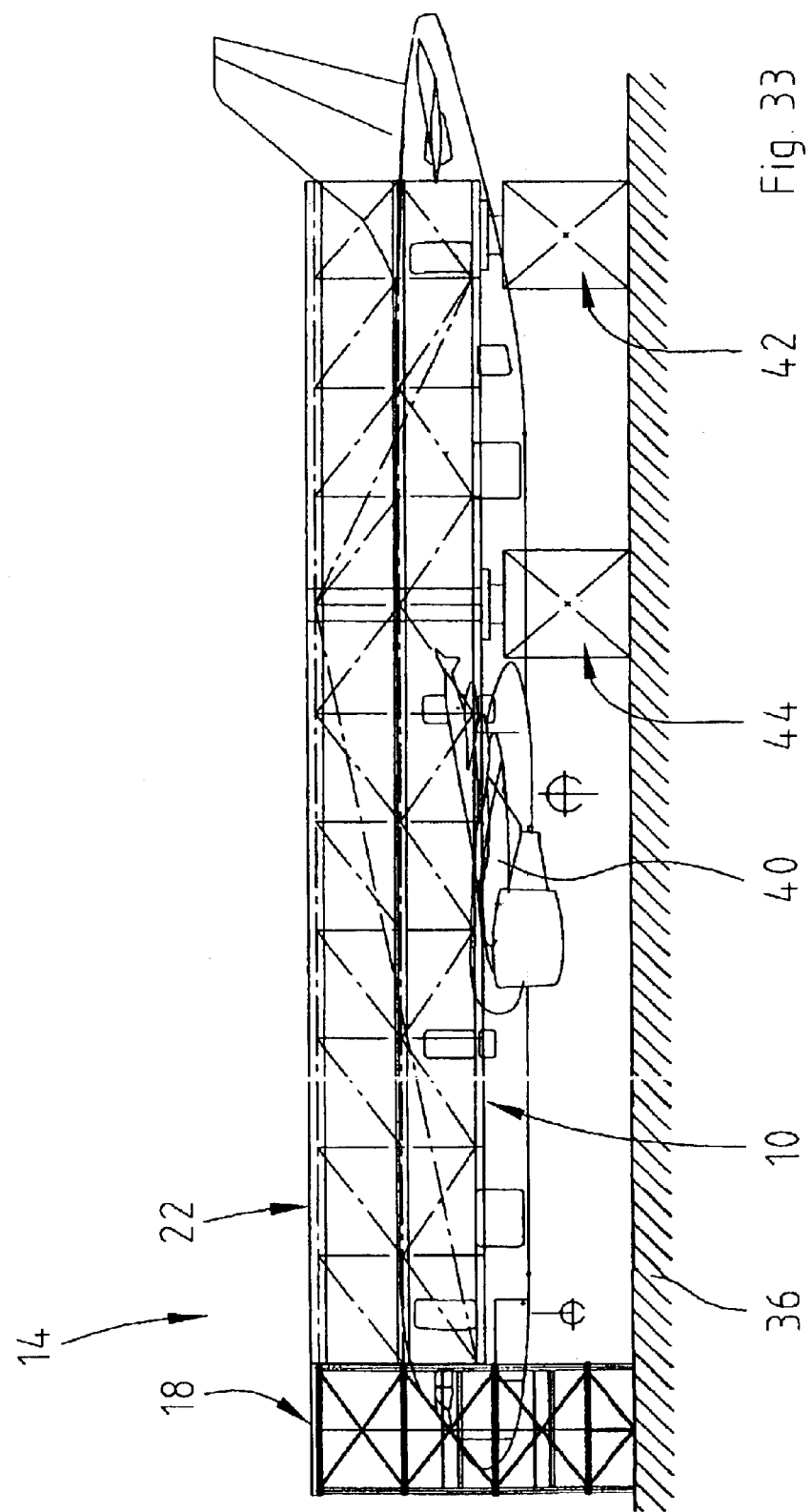

As is shown in FIG. 28, the supports can also be provided singly if they are suitably reinforced and co-operate with suitably reinforced beams of the dock section 22. The supports 42 and 44 are then arranged in the vertical longitudinal center plane of the dock section 22. Prevention of tilting of the dock section 22 through rotation about the longitudinal axis is then taken over by the dock section 18 provided at the inner end of the dock section 22, which section 18 has a wider base and/or additional supports, which are provided in the part of the dock section 22 which is never entered by the wing of an aircraft and are arranged in pairs.

In the further embodiment according to FIGS. 29 to 33, the supports 42 and 44 again take the form of lattice strut structures and contain stairways 124, 126. Hydraulic cylinders 46 of short construction are again incorporated in the supports 42, 44 and serve to release the supports 42, 44 or to apply them firmly against the underside of the dock section 22. This makes possible release of the supports for subsequent movement on the floor 36 of the hangar without additional lifting means.

The supports 42, 44 run on wheels 158 and are therefore movable in the transverse direction. Wheels 160 are similarly provided for the dock section 18. For docking and undocking, the whole dock unit 14 and the analogously constructed dock unit 12 can therefore be moved in the transverse direction to an outer section of the wing which is narrower. This makes it possible, if the support 42 is in itself sufficient the carry the dock section 22, to provide the support 44 closer to the support 42, so that both supports alternatively support the dock section 22 under more similar conditions.

Transverse movability of the dock units, at least to a lesser degree, is also advantageous with a view to preventing unintentional touching of the dock units when docking and undocking.

The supports 42, 44 include self-contained hydraulic power units 162 to supply the hydraulic cylinders 46.

The above-described dock units can also be used in maintenance hangars, the roofs of which include recesses to accommodate aircraft rudders.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A dock unit for maintenance of an aircraft or the like, comprising:
   a frame which carries at least one working floor
   the frame is supported in an unchangeable manner at one end and an outer end of which rests on a floor via an outer support and at least one further, inner support;
   wherein the outer support and the further, inner supports are movable between a prop position in which they engage supportingly against the frame and a clearance position in which they open a passage between the frame and a floor.

2. A dock unit according to claim 1, wherein at least one of the inner support and outer support is adjustable in a vertical direction.

3. A dock unit according to claim 2, wherein the at least one inner support and outer support that is adjustable in a vertical direction is attached to the frame.

4. A dock unit according to claim 1, wherein at least one of the inner support and outer support is retractable into a floor.

5. A dock unit according to claim 4, wherein a free end face of the at least one inner support and outer support that is retractable into the floor is substantially flush with a floor in the fully retracted state.

6. A dock unit according to claim 1, wherein at least one of the inner support and the outer support is movable across a floor.

7. A dock unit according to claim 6, wherein the at least one inner support and outer support which is movable across a floor is coupled to one of a vehicle and a carriage which runs on a floor.

8. A dock unit according to claim 6, wherein the at least one inner support and outer support which is movable across a floor is of lower height than a passage between an underside of the frame and a floor therebelow and has an adjustable strut, the stroke of which is short in comparison to the height of the passage, the total height of the support and the adjustable strut in the fully extended state of the latter being greater than the height of the passage.

9. A dock unit according to claim 6, wherein the at least one inner support and outer support which is movable across a floor is provided with a stairway.

10. A dock unit according to claim 1, wherein the at least one inner support and outer support which is movable across a floor comprises a lattice strut structure.

11. A dock unit according to claim 1, wherein at least one of the inner support and the outer support is pivotable.

12. A dock unit according to claim 11, wherein the pivot axis of the pivotable one of the at least one inner support and outer support is disposed horizontally and transversely with respect to the longitudinal direction of the frame.

13. A dock unit according to claim 1, characterized in that at least one of the inner support and the outer support comprises at least one of a hydraulic cylinder and a threaded spindle.

14. A dock unit for maintenance of aircraft, comprising:
   a frame which provides at least one working floor and is supported in an unchangeable manner at a first, inner end and rests on a floor at a second, outer end via an outer support, wherein the outer support is movable between a prop position supporting the frame and a clearance position unblocking the space between the frame and a floor; and
   a suspension arrangement is provided which engages on the frame when the outer support is positioned in the clearance position.

15. A dock unit according to claim 14, further comprising an inner support which is displaceable between a prop position supporting the frame and a clearance position unblocking the space between the frame and a floor.

16. A dock unit according to claim 14, wherein the suspension arrangement includes a crane.

17. A dock unit according to claim 16, wherein the crane is carried by a crane trolley which runs on a crane rail fixed to a roof structure.

18. A dock unit according to claim 16, wherein the crane is carried by a vehicle.

19. A dock unit according to one of claims 14, further comprising at least one presence sensor arranged at least one of in front of and behind at least one of the inner support and the outer support, the at least one presence sensor capable of responding to the presence of an object in a space located between the frame and floor.

20. A dock unit according to claim 19, further comprising at least one position indicator, the at least one position indicator indicating whether the movable supports are in the prop position or in the clearance position.

21. A dock unit according to claim 19, further comprising a control circuit for at least one of a drive and a brake which co-operate, in a corresponding one of a driving and braking manner with an aircraft, the control circuit activates a drive or releases a brake in the presence of an output signal of the presence sensor only if an output signal for the clearance position corresponding with the clearance position of a subsequent displaceable inner support is received at the same time from the position indicator of the respective inner support.

22. A dock unit according to claim 1 wherein the frame is movable in a transverse horizontal direction with respect to a longitudinal direction of the frame.

* * * * *

UNITED STATES PATENT AND TRADEMARK OFFICE
CERTIFICATE OF CORRECTION

PATENT NO. : 6,782,665 B2
DATED : August 31, 2004
INVENTOR(S) : Fahrion

It is certified that error appears in the above-identified patent and that said Letters Patent is hereby corrected as shown below:

Title page,
Item [56], References Cited, U.S. PATENT DOCUMENTS, insert
-- 4,690,246 A    *    9/1987    Hornagold et al. --.

Column 3,
Line 10, delete "according of" and substitute -- according to --.

Column 10,
Lines 22 and 29, delete "function to" and substitute -- function so --.

Column 11,
Line 60, delete "aircraft or the like," and substitute -- aircraft, --.

Column 12,
Line 35, delete "claim 1," and substitute -- claim 6, --.

Signed and Sealed this

First Day of February, 2005

JON W. DUDAS
*Director of the United States Patent and Trademark Office*